United States Patent
Kondo et al.

[11] Patent Number: 5,526,462
[45] Date of Patent: Jun. 11, 1996

[54] HONEYCOMB HEATER WITH MOUNTING MEANS PREVENTING AXIAL-DISPLACEMENT AND ABSORBING RADIAL DISPLACEMENT

[75] Inventors: Tomoharu Kondo, Toki; Tadato Ito; Yuji Deguchi, both of Nagoya, all of Japan

[73] Assignee: NGK Insulators, Ltd., Japan

[21] Appl. No.: 209,721

[22] Filed: Mar. 14, 1994

[30] Foreign Application Priority Data

Mar. 22, 1993 [JP] Japan .................... 5-061848
Feb. 2, 1994 [JP] Japan .................... 6-010748

[51] Int. Cl.⁶ .................... F01N 3/20; H05B 3/00
[52] U.S. Cl. .................... 392/485; 219/536; 219/552; 55/DIG. 30; 422/180
[58] Field of Search .................... 392/485–489; 219/552, 553, 505, 536; 422/174, 177, 179, 180; 55/DIG. 30; 60/300

[56] References Cited

U.S. PATENT DOCUMENTS

| | | | |
|---|---|---|---|
| 3,937,617 | 2/1976 | Yaguchi | 422/179 |
| 4,115,071 | 9/1978 | Masuda et al. | 422/179 |
| 4,142,864 | 3/1979 | Rosynsky et al. | 422/179 |
| 4,161,509 | 7/1979 | Nowak | 422/179 |
| 4,344,922 | 8/1982 | Santiago et al. | 422/179 |
| 4,347,219 | 8/1982 | Noritake et al. | 422/179 |
| 4,928,485 | 5/1990 | Whittenberger | 60/299 |
| 4,976,929 | 12/1990 | Cornelison et al. | 422/174 |
| 5,063,029 | 11/1991 | Mizuno et al. | 422/177 |
| 5,079,210 | 1/1992 | Kaji et al. | 502/439 |
| 5,080,953 | 1/1992 | Horikawa et al. | 428/116 |
| 5,177,961 | 1/1993 | Whittenberger | 60/300 |
| 5,194,719 | 3/1993 | Merkel et al. | 219/552 |
| 5,202,548 | 4/1993 | Kondo et al. | 219/552 |
| 5,366,700 | 11/1994 | Humpolik et al. | 422/177 |

FOREIGN PATENT DOCUMENTS

| | | |
|---|---|---|
| 509207 | 10/1992 | European Pat. Off. . |
| 2422110 | 11/1975 | Germany . |
| 3926072 | 2/1991 | Germany . |
| 3930680 | 3/1991 | Germany . |
| 4131970 | 4/1992 | Germany . |
| 2-298620 | 12/1990 | Japan . |
| 89/10471 | 11/1989 | WIPO . |

*Primary Examiner*—John A. Jeffery
*Attorney, Agent, or Firm*—Parkhurst, Wendel & Burr

[57] ABSTRACT

A heater unit comprising (1) a honeycomb heater comprising (a) a metallic honeycomb structure having a large number of passages parallel to the direction of a gas flowing through the heater unit and (b) at least one electrode for electrification of the honeycomb structure, attached to the honeycomb structure, and (2) a metallic casing for holding the honeycomb heater (1) therein via at least one metallic supporting member, in which heater unit an insulation portion is provided at least either at the connection area where the honeycomb heater and the supporting member are connected or at the connection area where the supporting member and the casing are connected, and the supporting member has such a structure as to be able to absorb the displacement of the honeycomb heater which appears in a direction substantially perpendicular to said gas flow direction, and has a function of fixing the honeycomb heater against its displacement which appears in the gas flow direction. The heater unit, when exposed to severe driving conditions of automobiles, etc. and subjected to vibration and the expansion and contraction caused by thermal shock, gives rise to neither breakage of honeycomb heater nor peeling.

20 Claims, 22 Drawing Sheets

GAS INLET

GAS FLOW

D-D

CAULKING

HONEYCOMB HEATER WITH MOUNTING
MEANS PREVENTING
AXIAL-DISPLACEMENT AND ABSORBING
RADIAL DISPLACEMENT

BACKGROUND OF THE INVENTION (1) Field of the Invention

The present invention relates to a heater unit which can be suitably used for purification of automotive exhaust gases, etc.

(2) Prior Art

In addition to hitherto known porous ceramic honeycomb structures, metallic honeycomb structures have recently drawn attention as a catalyst, a catalyst carrier or the like for conversion of the nitrogen oxides ($NO_x$), carbon monoxide (CO) and hydrocarbons (HC) contained in the exhaust gases discharged from the internal combustion engines of automobiles, etc.

Meanwhile, as the regulation for exhaust gases has become stricter, it is strongly desired to develop a heater or the like which can reduce emissions during the cold start of engine.

As an example of the honeycomb structures, there is known, for example, a technique disclosed in Japanese Utility Model Application Kokai (Laid-Open) No. 67609/1988. The literature discloses a catalytic converter comprising (1) a main ceramic monolithic catalyst and (2) a metallic monolithic catalyst capable of generating heat when electrified, which comprises a metallic carrier and alumina coated thereon and which is provided upstream of the main monolithic catalyst but closely thereto.

In the catalytic converter disclosed in Japanese Utility Model Application Kokai (Laid-Open) No. 67609/1988, the metallic monolithic catalyst (2) is simply a preheater capable of generating heat when an electric current is passed from the center of the foil type metallic honeycomb structure to the outer periphery, and has no resistance adjusting means (that is, only the material, dimension and rib thickness of the honeycomb structure are specified and no resistance adjustment means is provided) and accordingly does not have an appropriate temperature elevation property.

Hence, the present applicant previously proposed, in Japanese Patent Application Kokai (Laid-Open) No. 295184/1991, a heater comprising a honeycomb structure and at least two electrodes for electrification of the honeycomb structure, attached to the honeycomb structure, wherein the honeycomb structure has a resistance adjusting means (e.g. slits) between the electrodes and the open ends of the slits (the portions of the slits at the periphery of the honeycomb structure) are filled with a zirconia type heat-resistant inorganic adhesive. The present applicant also proposed, in Japanese Patent Application Kokai (Laid-Open) No. 241715/1992, a method for holding a honeycomb heater in a casing by covering the periphery of the honeycomb heater with a metallic band via an insulating material (e.g. ceramic mat, ceramic cloth or the like). Further, Japanese Patent Application Kokai (Laid-Open) No. 241715/1992 discloses a method for forming an insulating protective film on the surface of said band or a ring by coating the band or ring with a ceramic (e.g. $Al_2O_3$ or $ZrO_2$) by flame spraying etc.

The present applicant further proposed, in Japanese Patent Application No. 167645/1991, a heater unit comprising (1) a resistance adjusting type heater wherein at least part of the resistance adjusting means is coated with an insulating ceramic (e.g. vitreous enamel) or a metallic spacer coated with an insulating ceramic is inserted into the open end of each slit (resistance adjusting means) and (2) a casing for holding the heater (1) therein, coated with an insulating ceramic.

In each of the above techniques, the resistance adjusting means is insulated and protected. Under severe driving conditions (vibration and thermal shock, in particular) of automobiles, however, the heater of Japanese Patent Application Kokai (Laid-Open) No. 295184/1991 may detach; and the heater of Japanese Patent Application kokai (Laid-Open) No. 241715/1991 may develop, owing to the vibration of horizontal and vertical directions, the deformation of heater, breakage of spacer and wearing of insulating mat. In the heater unit of Japanese Patent Application No. 167645/1991, the above problems are mostly solved; however, all the portions, through which an electric current is presumed to pass, must be coated with a ceramic and the technique is therefore not an easy one.

In order to make lighter the heater system including a battery and cables or achieve the higher purification of exhaust gas, it is desired to install a heater in the vicinity (e.g. manifold position) of engine so that such installment can heat an exhaust gas to a higher temperature and thereby can allow a catalyst to exhibit its catalytic activity more quickly. However, when a heater is provided in the manifold position, the vibration is severe (about 30 G); the main direction of the vibration is a vertical direction which is the same as the direction of the exhaust gas flowing through the heater unit; moreover, the thermal shock applied to the heater unit is larger.

SUMMARY OF THE INVENTION

The present invention has been made in view of the above-mentioned problems of the prior art. According to the first aspect of the present invention, there is provided a heater unit comprising a honeycomb heater secured to a metallic casing for holding the honeycomb heater therein via at least one metallic supporting. An insulation portion is provided at least either at the area where the honeycomb heater and the supporting member are connected or at the area where the supporting member and the casing are connected, and the supporting member has such a structure as to be able to absorb the displacement of the honeycomb heater which appears in a direction substantially perpendicular to said gas flow direction, and has a function of fixing the honeycomb heater against its displacement which appears in the gas flow direction.

According to the second aspect of the present invention, there is provided a heater unit comprising a honeycomb heater including at least one electrode for electrification of the honeycomb structure, the electrode being connected with the honeycomb heater via a metallic connecting member and is fixed to a casing for holding the honeycomb heater via an insulating member. The connecting member has such a structure as to be able to absorb the displacement of the honeycomb heater which appears in a direction substantially perpendicular to the gas flow direction.

According to the third aspect of the present invention, there is provided a heater unit comprising a honeycomb heater including at least one electrode for electrification of the honeycomb structure and in which heater unit the electrode is connected directly with the honeycomb heater and being fixed to the casing via an insulating member and a buffer member connected to the insulating member. The buffer member has such a structure as to be able to absorb the displacement of the honeycomb heater which appears in a direction substantially perpendicular to the gas flow direction.

When the heater unit of the first aspect of the present invention is allowed to have such a structure that the electrode is connected with the honeycomb heater via the connecting member of the second aspect of the present invention or via the buffer member of the third aspect of the present invention, there is substantially no fear of deformation or breakage of honeycomb heater. Therefore, a heater unit having such a structure is very preferable.

BRIEF DESCRIPTION OF THE DRAWINGS

FIG. 1(A) is a plan view, and FIG. 1(B) is a side view.

FIG. 1(A) is a plan view, and FIG. 2(B) is a side view.

FIG. 4(A) is a plan view, and FIG. 4(B) is a side view.

FIG. 8(A) is a plan view; FIG. 8(B) is a sectional view taken at the A—A line of FIG. 8(A); and FIG. 8(C) is a side view showing a fragmentary section.

FIG. 9(A) is a plan view, and FIG. 9(B) is a side view.

FIG. 10(A) is a plan view, and FIG. 10(B) is a side view.

FIG. 11(A) is a plan view, and FIG. 11(B) is a side view.

FIG. 12(A) is a plan view, and FIG. 12(B) is a sectional view taken at the B—B line of FIG. 12(A).

FIG. 22(A) is a fragmentary plan view, and FIG. 22(B) is a sectional view taken at the C—C line of FIG. 22(A).

FIG. 23(A) is a fragmentary plan view, and FIG. 23(B) is a sectional view taken at the D—D line of FIG. 23(A).

FIG. 31(A) is a fragmentary sectional view when seen from the front, and FIG. 31(B) is a fragmentary sectional view when seen from the side.

In FIGS. 1 to 35, numeral 10 is a honeycomb structure; numeral 11 is a slit; numeral 12 is a honeycomb heater; numeral 13 is a groove; numeral 14 is the arc portion of a supporting member; numeral 15 is the leg portion of a supporting member; numeral 17 is an insulating coating; numeral 18 is a cementing material; numeral 19 is a casing; numeral 20 is a ceramic mat; numeral 21 is a connection area; numeral 22 is an electrode; numeral 23 is a filler; numeral 24 is a reinforced portion; numeral 25 is a connecting member; numeral 26 is an insulator; numeral 27 is a buffer member; numeral 29 is a nut; numeral 30 is a jig for fixation of insulator; numeral 31 is an inorganic cement layer; numeral 32 is a protective mat; and numeral 33 is a fiber mat.

DETAILED DESCRIPTION OF THE INVENTION

Figure 1A:
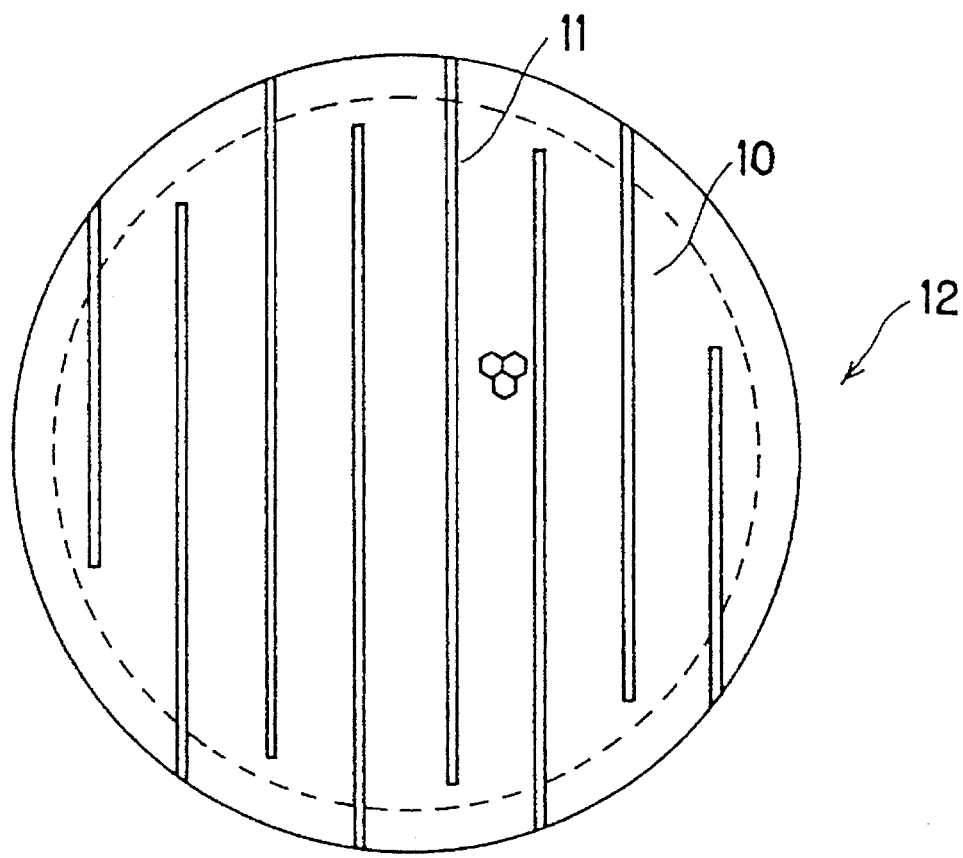
FIGS. 1(A) and 1(B) show an example of the honeycomb heater used in the present invention.
Figure 1B:
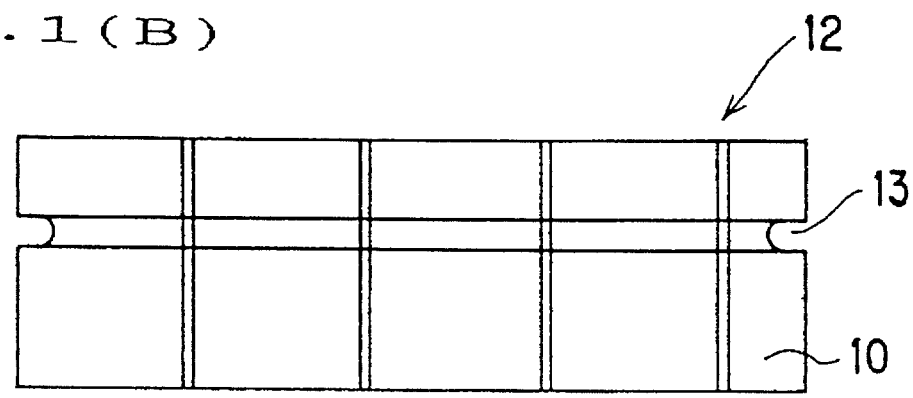

In the heater unit of the present invention, the honeycomb heater is held in the casing by the following three holding modes.

(1) The honeycomb heater is held in the casing via at least one metallic supporting member (the first holding mode).

(2) The honeycomb heater is held in the casing via at least one electrode and at least one metallic connecting member (the second holding mode).

(3) The honeycomb heater is connected directly with at least one electrode, and each electrode is fixed to the casing via a buffer member (the third holding mode).

In any of the three holding modes, an insulating member must be interposed between the honeycomb heater and the casing.

In the above holding modes, the supporting member has such a structure as to be able to absorb the displacement of the honeycomb heater which appears in a direction perpendicular to the direction of a gas flowing through the heater unit, and has a function of fixing the honeycomb heater against its displacement which appears in said gas flow direction. Meanwhile, the connecting member and the buffer member must each have such a structure as to be able to absorb the displacement of the honeycomb heater which appears in a direction perpendicular to said gas flow direction. In some cases, neither of the connecting member and the buffer member has a function of fixing the honeycomb heater against its displacement which appears in said gas flow direction. In such cases, the electrode must have a function of fixing the honeycomb heater.

As a result, the heater unit of the present invention constituted as above can protect the honeycomb heater from the breakage and deformation which may be caused by vibration and the expansion and contraction due to thermal shock under the severe driving conditions of automobiles.

Next, the constituent features of the present invention are described in detail.

The metallic honeycomb structure used in the present invention has a large number of passages parallel to the direction of a gas flowing therethrough.

The honeycomb structure may be made of any material as long as it is a metal capable of generating heat when electrified. The honeycomb structure preferably has a Fe—Cr—Al type composition because the structure is exposed to high temperatures of automotive exhaust gases, etc. and must be heat-resistant and oxidation-resistant.

The cell shape of the honeycomb structure has no particular restriction, but a hexagon, a higher polygon, a corrugated shape, etc. are preferred to a tetragon and a triangle because the former shapes are more resistant to thermal shock and more flexible to expansion and contraction. The cell number of the honeycomb structure has no particular restriction, either, but is preferably 100–600 cells/in.$^2$ in view of the thermal conductivity of the structure, the purification efficiency of catalyst, etc. When the cell number is larger than 600 cells/in.$^2$, there arises the pressure loss of gas.

The honeycomb structure may be either a foil type obtained by corrugating a rolled thin plate (a foil) and winding the foil, or an extrusion type obtained by extrusion and powder metallurgy. The extrusion type is preferred in view of the structural durability.

The honeycomb structure must have a controlled resistance so as to be able to generate desired heat when electrified. The honeycomb structure of extrusion type, for example, has, as a resistance adjusting means, for example, slits as disclosed in Japanese Patent Application Kokai (Laid-Open) No. 295184/1991. In this case, the honeycomb structure is provided with at least two electrodes for electrification, at the periphery, whereby a honeycomb heater is formed. When this honeycomb heater is used as a catalytic converter, a catalyst is generally coated on the honeycomb heater.

The honeycomb heater obtained as above is held in a casing. At that time, the following considerations must be made.

Since the metallic honeycomb structure has a thermal expansion coefficient as large as $10–20\times10^{-6}/°C.$, the displacement which appears owing to the difference in thermal expansion between the honeycomb structure of high temperature and the casing of relatively low temperature, must be absorbed. Further, the honeycomb heater must be strongly fixed to the casing in order to maintain the breakage endurance and insulation ability of the honeycomb structure under the severe vibration when used in automobiles.

Hence, in the first aspect of the present invention, the honeycomb heater is held in and fixed to the metallic casing via at least one metallic supporting member.

The most important function of the supporting member is to absorb the displacement of the honeycomb heater which appears in a direction perpendicular to the direction of gas flow (said perpendicular direction is hereinafter referred to as radial direction) and further to fix the honeycomb heater against its displacement which appears in the gas flow direction.

The supporting member basically has the following constituent features. (The specific constitution of the supporting member is described later.)

(1) In order to absorb the displacement of the honeycomb heater which appears in its radial direction, the supporting member has a flexible structure (e.g. a spring structure) in the radial direction of the honeycomb heater.

(2) In order to fix the honeycomb heater against its displacement which appears in the direction of gas flow, the supporting member has a structure by which the honeycomb heater is fixed so as to have a large resistance and a large strength in the direction of gas flow.

Since the honeycomb heater and the casing must be insulated from each other, at least either of the connection area between the honeycomb heater and each supporting member and the connection area between each supporting member and the casing has an insulation portion made of an insulating member. Each of the two connection areas preferably has an insulating property in view of the safety standpoint but, generally, either of the areas is allowed to have an insulating property in view of the simplification of the honeycomb heater structure.

The position of the connection area between the honeycomb heater and each supporting member is not restricted and may be the periphery of the honeycomb heater, the vicinity of the periphery of the heater, the center of the heater, etc. However, the periphery of the honeycomb heater or the vicinity of the periphery of the heater is preferable in view of the heat resistance of the connection area and the hindrance of gas flow by the position of the connection area.

When the honeycomb heater is provided just below the manifold and undergoes the most severe conditions, the displacement of the honeycomb heater appearing in the radial direction is, for example, a displacement of the heater appearing owing to the difference in thermal expansion between the heater of high temperature and the casing of relatively low temperature during the inflow of high temperature gas into the heater, and the displacement of the heater appearing in the direction of gas flow is a displacement of the heater appearing owing to the vibration of the engine.

Since the heater unit of the present invention possesses sufficient rigidity against vibrations not only parallel but also perpendicular to the direction of gas flow, the heater unit is not broken by sympathetic vibrations. Therefore, the heater unit of the present invention possesses sufficient durability against vibrations of any direction, and the position of the heater unit of the present invention is not-limited to the manifold position, and any position in the exhaust gas pipe such as a position under the floor will do.

More detailed description is made referring to drawings.

First, description is made on the type A of the heater unit according to the first aspect of the present invention.

FIGS. 1(A) and I(B) illustrate a honeycomb heater 12 obtained by forming slits 11 as a resistance adjusting means in a honeycomb structure 10 having hexagonal cells.

A groove 13 is formed on the periphery of the honeycomb heater 12. The groove 13 can be formed by applying cylindrical grinding to a sintered honeycomb structure 10 but, when the honeycomb structure 10 is produced by extrusion and powder metallurgy, the groove 13 may be formed by applying cylindrical grinding to a dried honeycomb structure 10.

Figure 2A:
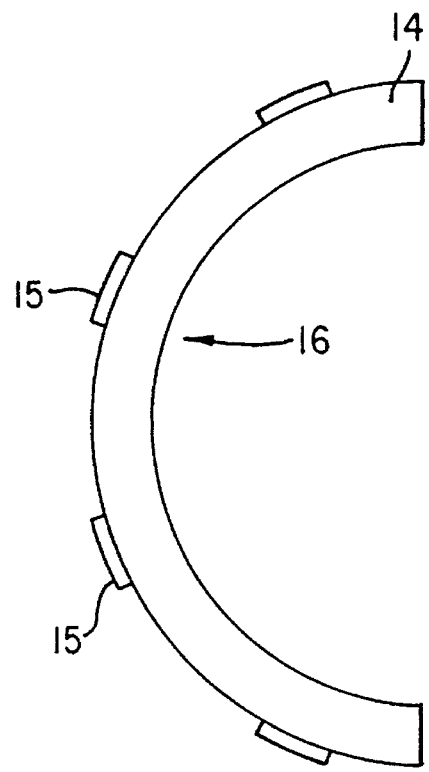
FIGS. 2(A) and 2(B) show an example of the supporting member used in the present invention.
Figure 2B:
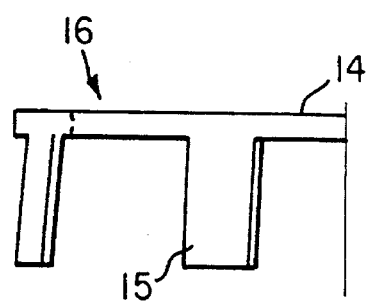

Two half-ring-shaped supporting members 16 as shown in FIGS. 2(A) and 2(B) are used as a supporting member. Each supporting member 16 has an arc portion 14 and leg portions 15.

Figure 3:
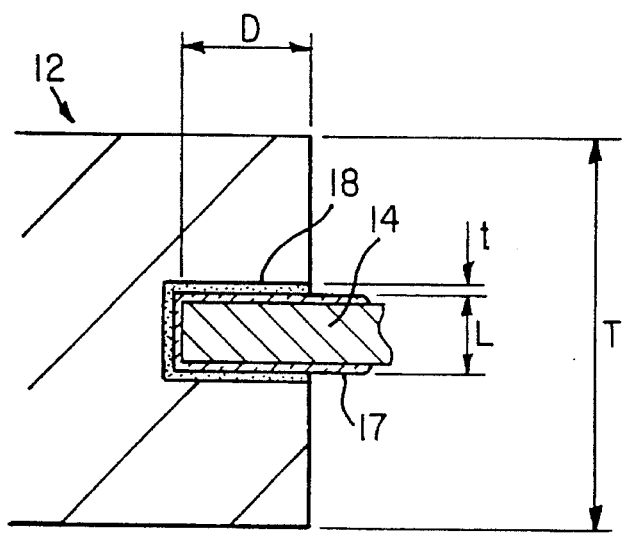
FIG. 3 is a fragmentary sectional view showing an example of the periphery of the honeycomb heater used in the present invention.

The arc portion 14 of each supporting member 16 is engaged in the groove 13 of the honeycomb heater 12, as shown in FIG. 3. The surface of each arc portion 14 is coated with an insulating coating 17 beforehand. The insulating coating 17 is formed by strongly adhering, to the arc surface, a heat-resistant inorganic material (e.g. glass including crystallized glass, ceramic or cement) by vitreous enamel process, flame spraying, ceramic coating, cement coating or the like.

The insulating coating 17 may also be applied to the surface of the groove 13 of the honeycomb heater 12 (this is not shown in FIG. 3). The thermal expansion coefficient of the insulating coating 17 preferably matches that of the supporting member 16.

In order to connect the supporting member 16 and the honeycomb heater 12, a cementing material 18 is used. The cementing material 18 can ordinarily be a heat-resistant inorganic cement made of $Al_2O_3$, $ZrO_2$, $SiO_2$—$Al_2O_3$ or the like. The cementing material 18 itself preferably has an insulating property.

Thus, an insulation portion is formed by the insulating coating 17 and the cementing material 18, whereby the honeycomb heater 12 and the supporting member 16 are connected via the insulation portion.

When the cementing material 18 itself has an insulating property, the insulating coating 17 is not necessarily required. The thickness of the insulating coating 17 is preferably 5–200 μm in view of the strength, insulating property and thermal shock resistance.

With respect to the shape of the insulation portion, the projected length L of the insulation portion in the direction of gas flow is preferably shorter than the thickness T of the honeycomb heater in the direction of gas flow.

Since the honeycomb heater 12 has a thermal expansion coefficient of ordinarily $10-20\times10^{-6}/°C$. and the insulation portion, for example, the cementing material 18 has a small thermal expansion coefficient of $1-10\times10^{-6}/°C$., the difference in thermal expansion coefficient between the honeycomb heater 12 and the insulation portion must be as small as possible. In this connection, L is ordinarily ½ of T or smaller. When the heater unit of the present invention is used for purification of automotive exhaust gases, L is preferably in the range of 0.5–10 mm. When L is smaller than 0.5 mm, a strong cementing is not ensured against vibration. When L is larger than 10 mm, the cementing material 18 may be broken by the difference in thermal expansion between the cementing material 18 and the honeycomb structure 10.

The depth D of the cementing portion (this D is nearly the same as the depth of the groove 13) is preferably in the range of 2–10 mm so that the D does not largely reduce the cross-sectional area of the portion of the honeycomb heater 12 through which a gas can pass and yet the D can afford a sufficient cementing strength.

The thickness t of the cementing material 18 is preferably 1 mm or smaller. When the t is larger than 1 mm, the adhesion strength is low and breakage may occur. The t is more preferably 0.01–0.5 mm.

In another example of the insulation portion, brazing may be conducted using an insulating material and a brazing material.

Figure 4A:
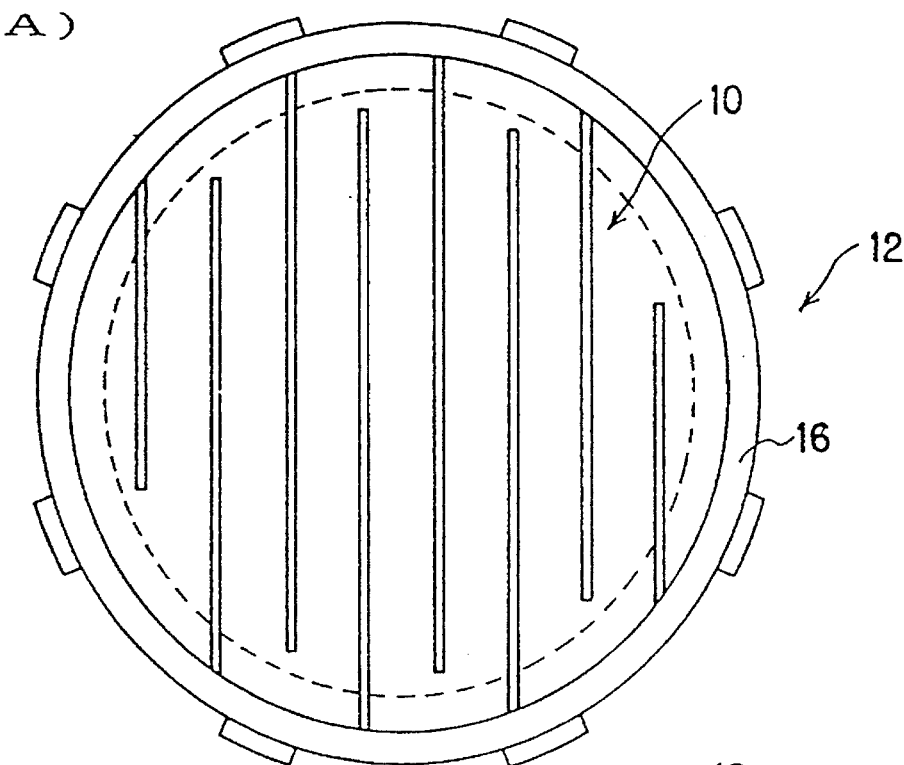
FIGS. 4(A) and 4(B) show an example of the honeycomb heater having a supporting member, used in the present invention.
Figure 4B:
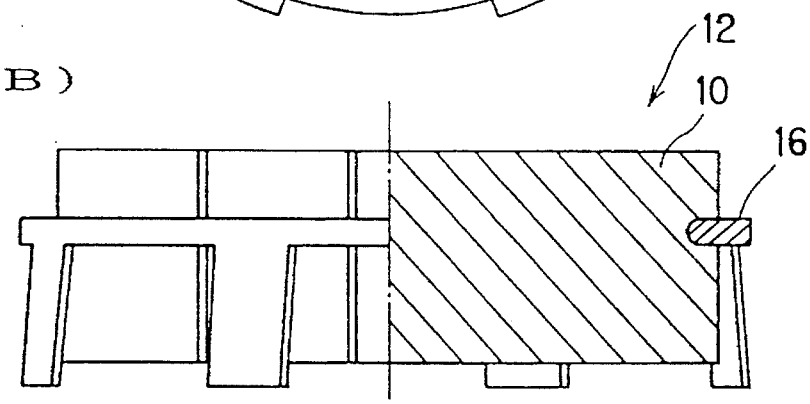
Figure 5:
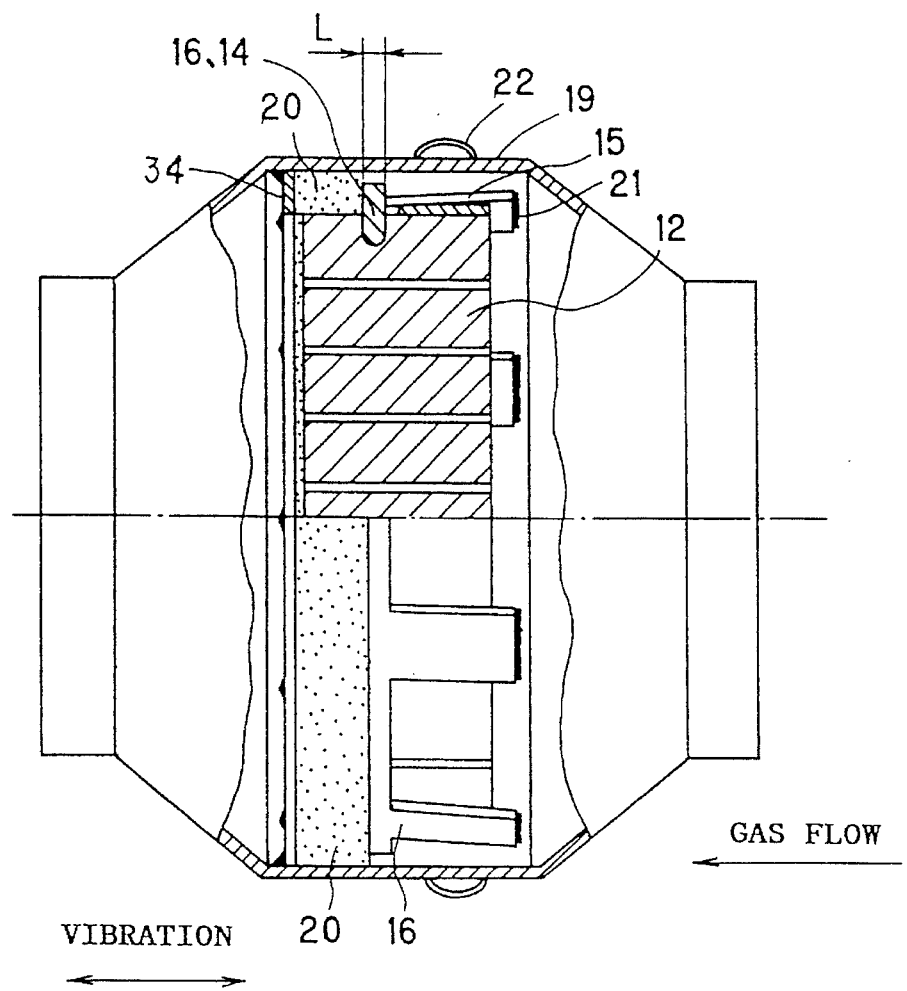
FIG. 5 is a partially cutaway sectional view showing an example of the heater unit according to the first aspect of the present invention.

As described above, two half-ring-shaped supporting members 16 are connected with a honeycomb heater 12, and the two supporting members 16 are connected to each other by welding, as shown in FIGS. 4(A) and 4(B), to obtain a honeycomb heater 12 to which a ring-shaped one-piece supporting member 16 is cemented. This honeycomb heater 12 is held in a metallic casing 19, as shown in FIG. 5.

Figure 6:
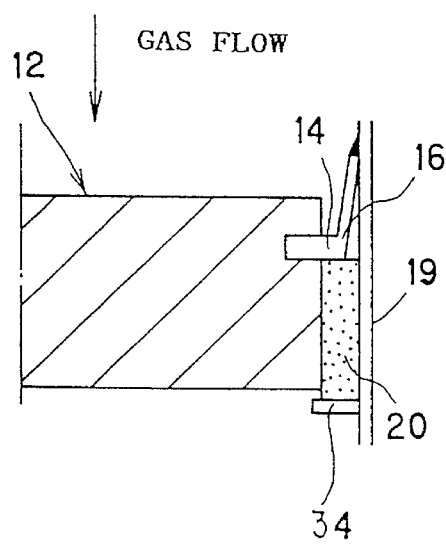
FIG. 6 is a fragmentary sectional view showing an example of the connection of a honeycomb heater and a casing via a supporting member, employed in the present invention.
Figure 8A:
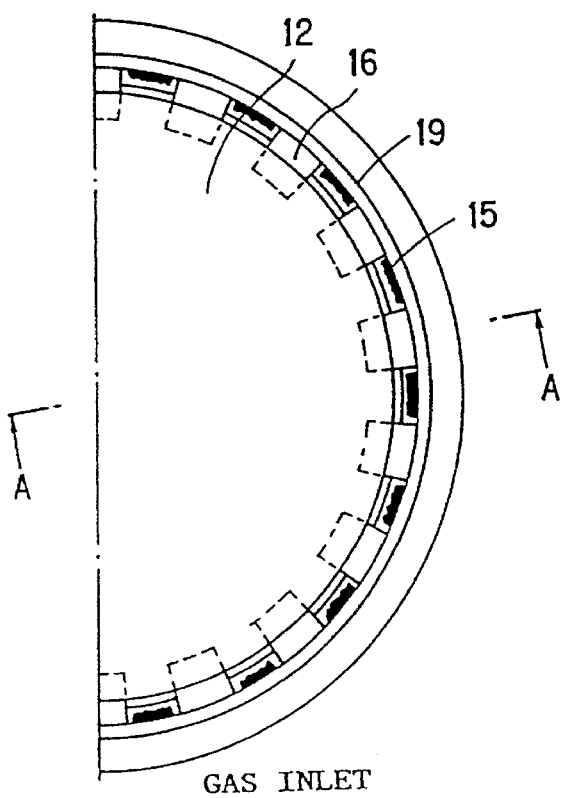
FIGS. 8(A), 8(B) and 8(C) show an example of the connection of a honeycomb heater and a casing via a supporting member, employed in the present invention.

That is, the leg portions 15 of the supporting member 16 are fixed to the casing 19 by means of welding, screwing, insertion, inlaying or the like. The periphery of the honeycomb heater 12 is filled with a ceramic mat 20 or the lake in order to prevent the gas passage by the periphery. It is required for the mat 20 to be excellent in insulation, and to have the characteristics that the mat 20 is not prone to be powdered and scattering by vibrations of the honeycomb heater 12. A baffle 34 is provided as shown in FIGS. 5 and 6 lest an exhaust gas should blow the mat 20 directly to prevent the mat 20 from erosion caused by an exhaust gas. Alternatively, the shape of the casing 19 can be modified as shown in FIGS.8(A) and 8(C) to prevent the mat 20 from erosion. When the insulation of the mat 20 remarkably deteriorates because carbons adhere to the mat 20 by the conditions of an exhaust gas, the use of the mat 20 is unneccessary. However, in this case is required a means such as a reduction of the gap between the baffle 34 and the honeycomb heater 12 so as to prevent the amount of the gas passage by the periphery from increasing.

The ring-shaped one-piece supporting member 16 has a thermal expansion coefficient preferably 1–2 times, more preferably 1–1.5 times that of the honeycomb heater 12. The linear distance between (1) the connection area (the groove 13) between the honeycomb heater 12 and the supporting member 16 and (2) the connection area 21 between the supporting member 16 and the casing 19 is preferably 20 mm or smaller. When the distance is larger than 20 mm, a larger displacement appears owing to the thermal expansion of the connection area 21 and the load at the connection area 21 is increased.

The thus obtained heater unit has the following features.

When the honeycomb heater 12 is heated and expanded at high temperatures, the ring-shaped one-piece supporting member 16 provided at the periphery of the heater 12 is also expanded while following the heat expansion of the heater 12; meanwhile, the leg portions 15 of the supporting member 16 are fastly fixed to the casing 19; as a result, the heater 12 resists displacement, for example, the vibration in the direction of gas flow and thereby exhibits high durability.

The electrode 22 for electrification and heating of the honeycomb heater 12 has no particular restriction, but is preferably an electrode connected to the honeycomb heater and the casing using a connecting member and a buffer member, as mentioned later, because such an electrode can absorb the displacement of the heater appearing in the radial direction.

Figure 7:
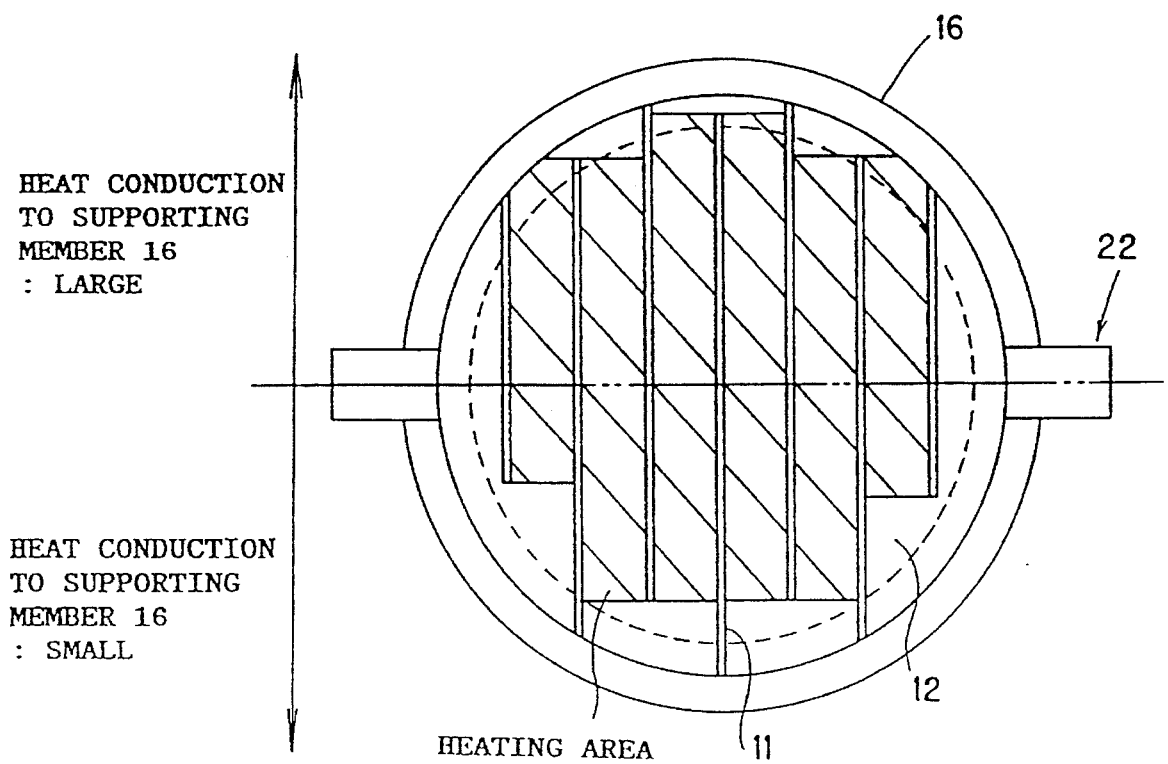
FIG. 7 is a plan view showing an example of the honeycomb heater having a supporting member, used in the present invention.

A preferable application example of the type A is shown in FIG. 7. That is, the length of each slit 11 is controlled to control the position of the dead end of each slit and thereby improve the heat conduction from the honeycomb heater 12 to the one-piece type supporting member 16 when the heater 12 is electrified, whereby the heat expansion of the supporting member 16 is allowed to follow the heat expansion of the heater 12 when the heater 12 is electrified. As shown, the slits 11 extend further toward casing 16 along an upper portion thereof, so as to provide a greater heating area for the upper half of the heater. In FIG. 7, numeral 22 is an electrode.

Figure 8B:
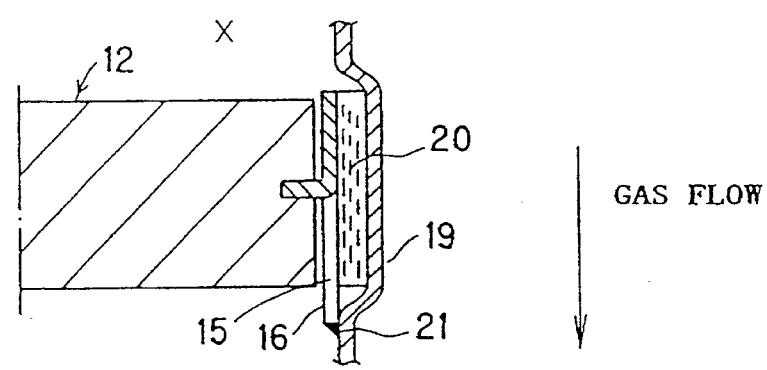
Figure 8C:
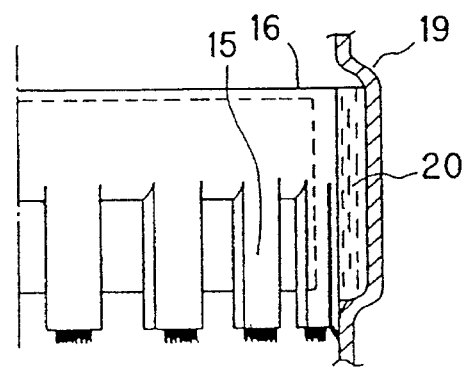

Another preferable application example of the type A is shown in FIGS. 8(A), 8(B) and 8(C), wherein part of the one-piece type supporting member 16 is projected toward the gas inlet side X of the heater 12 so that the temperature change of the supporting member 16 can better follow the temperature change of the heater 12.

Next, description is made on the heater unit of type B.

Figure 9A:
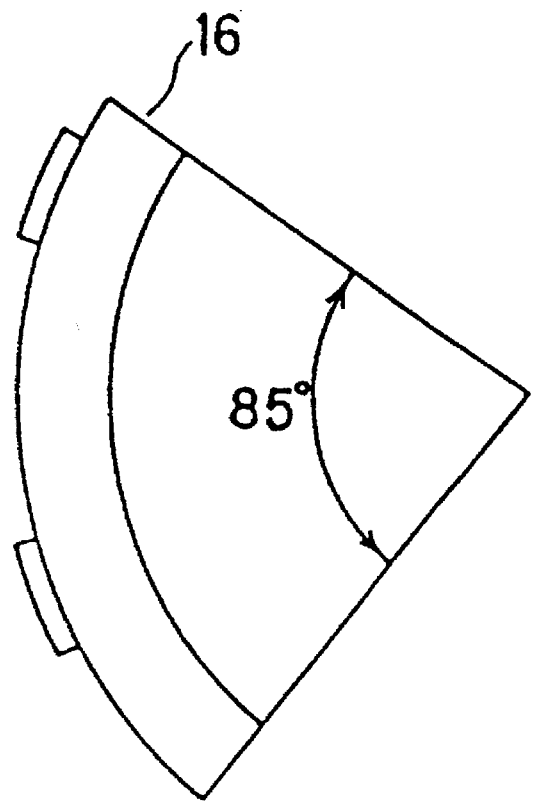
FIGS. 9(A) and 9(B) show another example of the supporting member used in the present invention.
Figure 9B:
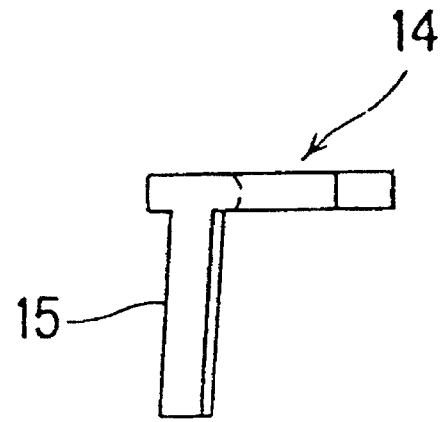
Figure 10A:
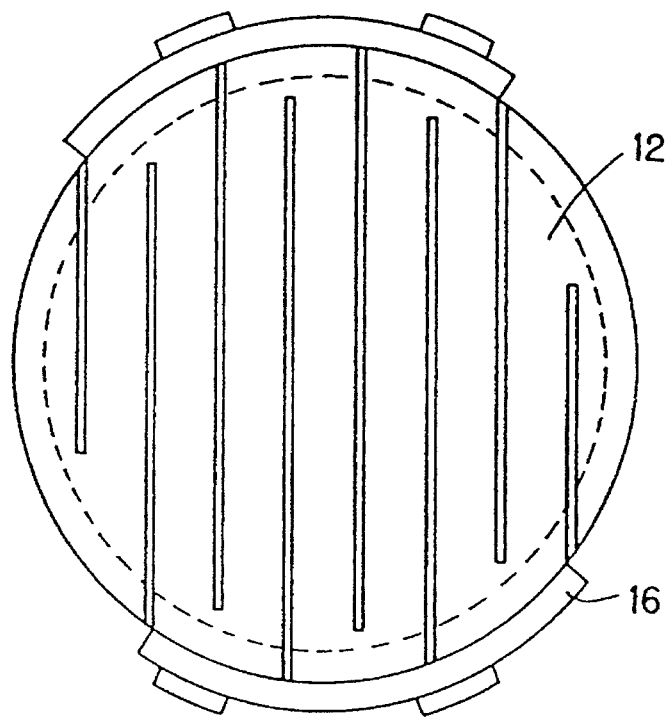
FIGS. 10(A) and 10(B) show another example of the heater unit used in the first aspect of the present invention.
Figure 10B:
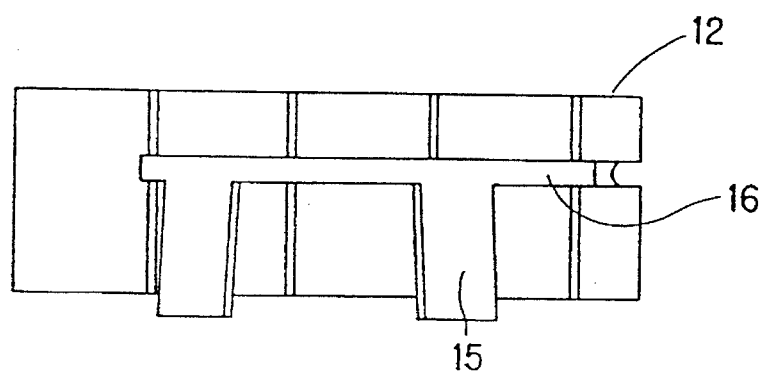

As mentioned above, the type A heater unit is a heater unit using a ring-shaped one-piece type supporting member 16 obtained by cementing two half-ring-shaped supporting members 16 to each other. The type B heater unit is a heater unit obtained by engaging a plurality of arc-shaped supporting members 16 [shown in FIGS. 9(A) and 9(B)] in the groove 13 of a honeycomb heater 12 without cementing the supporting members 16 to each other, as shown in FIGS. 10(A) and 10(B).

In the type B, since a one-piece type supporting member 16 is not used (unlike in the type A), the displacement of the honeycomb heater 12 in the radial direction due to the heat expansion at high temperatures is absorbed by the leg portions of the supporting members 16. Further, the displacement of the heater 12 in the direction of gas flow is resisted by the connection area between the arc portions 14 of the supporting members 16 and the casing, whereby the heater 12 is fixed.

Figure 11A:
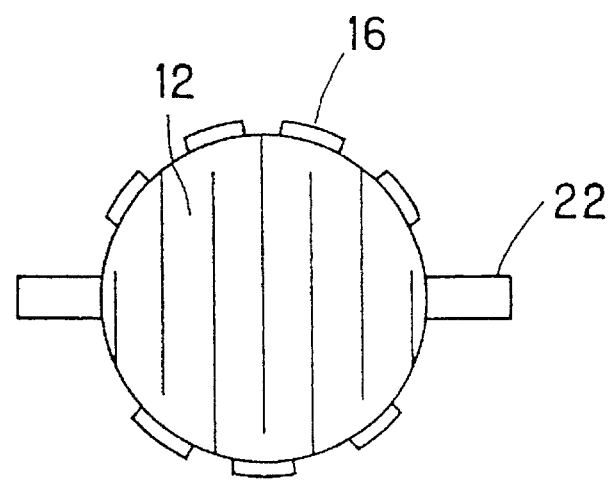
FIGS. 11(A) and 11(B) show still another example of the heater unit used in the first aspect of the present invention.
Figure 11B:
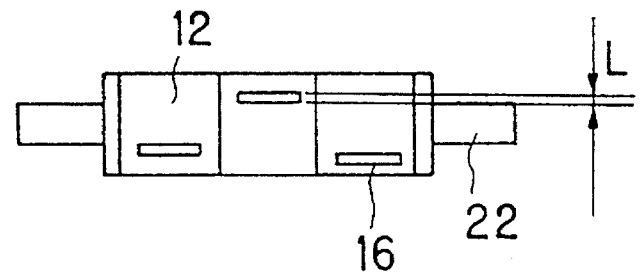

An application example of the type B is shown in FIGS. 11(A) and 11(B), wherein more than two supporting members 16 (seven supporting members) are used. All of the connection areas between each supporting member 16 and honeycomb heater 12 may not be on the same plane.

Next, description is made on the heater unit of type C.

Figure 12A:
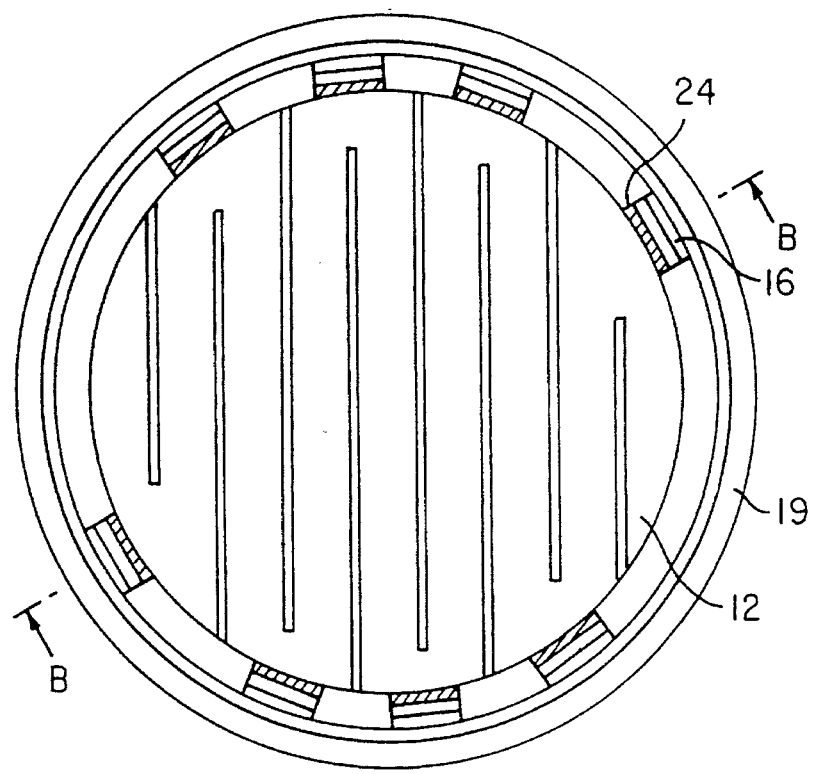
FIGS. 12(A) and 12(B) show still another example of the heater unit used in the first aspect of the present invention.
Figure 12B:
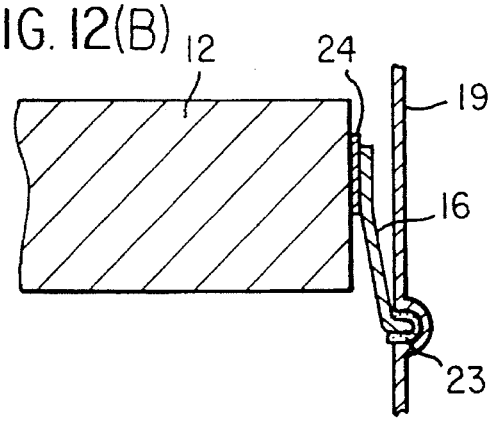

The type C heater unit is a heater unit having insulation portions at the connection areas between each supporting member 16 and casing 19, as shown in FIGS. 12(A) and 12(B).

Figure 13:
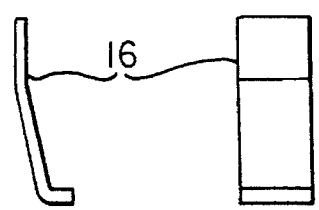
FIG. 13 shows the supporting member used in the heater unit of FIG. 12.

That is, a plurality of supporting members 16 each consisting of an "L" shaped thin plate, such as shown in FIG. 13, are fixed onto the periphery of a honeycomb heater 12 by means of welding or the like. (Therefore, each supporting member 16 and the honeycomb heater 12 communicate with each other.) The end of each supporting member 16 to be connected with a casing 19 is coated with an insulating coating as necessary, and is further coated with a filler 23 (e.g. ceramic mat) and is inserted into a groove formed in the casing (consisting of two parts). The groove is caulked so that that end of each supporting member 16 and the filler 23 are contained in the groove. Then, the two parts of the casing 19 are connected. As a result, the casing 19 and the honeycomb heater 12 are insulated from each other, and the supporting members 16 have the same effects as in the types A and B.

Description is made on application examples of the types A, B and C.

The application examples shown in FIGS. 14 to 18 show the sectional views of various supporting members 16. Each supporting member 16 may be a ring-shaped one-piece supporting member, or may consist of a plurality of parts.

Figure 14:
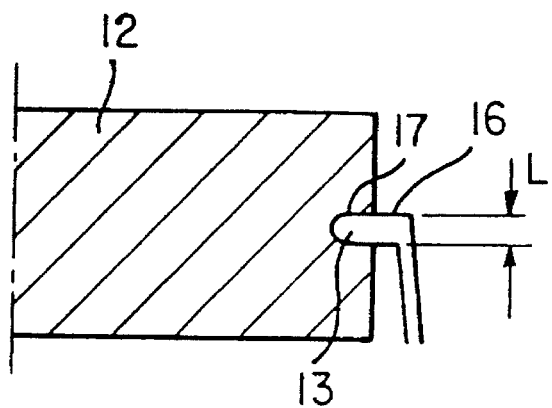
FIG. 14 shows an example of the connection of a honeycomb heater and supporting member(s), employed in the present invention.

FIG. 14 shows a supporting member having a round end at the portion to be connected with a honeycomb heater 12. Owing to the round end, an insulating coating 17 can have a higher film formability and, moreover, the stress concentration at the edge of the groove 13 of the honeycomb heater 12 can be relaxed.

Each of FIGS. 15 to 18 shows a case wherein strengthened portion(s) 24 is (are) beforehand provided at the periphery of or in the vicinity of the periphery of a honeycomb heater 12 and wherein supporting member(s) 16 is (are) lastly connected with the strengthened portion(s) 24. The strengthened portion(s) 24 can be produced, when powder metallurgy is employed, by cementing, to a dried honeycomb heater 12, a dried or undried body having the same composition as the honeycomb heater 12, processed so as to have a desired shape and then firing the body-cemented honeycomb heater. Owing to the strengthened portion(s) 24, the connection area(s) between the honeycomb heater 12 and the supporting member(s) 16 has (have) a higher strength.

Figure 15:
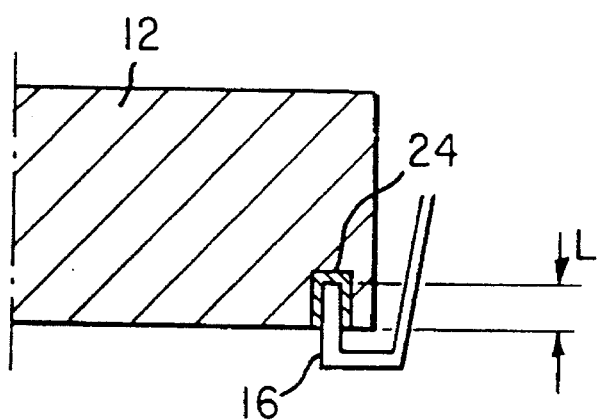
FIG. 15 shows an example of the connection of a honeycomb heater and supporting member(s), employed in the present invention.
Figure 16:
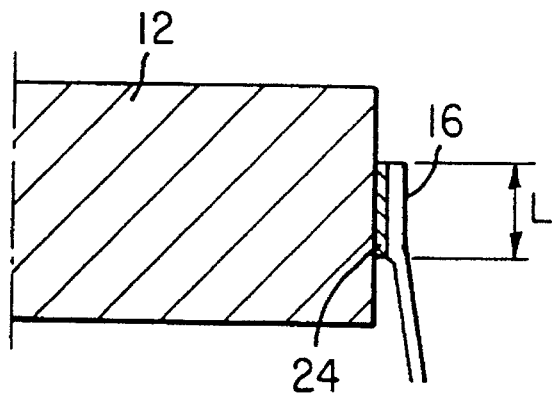
FIG. 16 shows an example of the connection of a honeycomb heater and supporting member(s), employed in the present invention.
Figure 17:
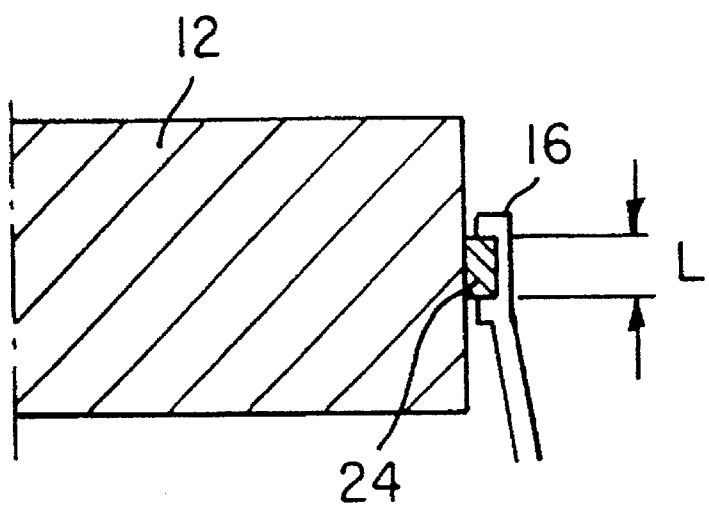
FIG. 17 shows an example of the connection of a honeycomb heater and supporting member(s), employed in the present invention.
Figure 18:
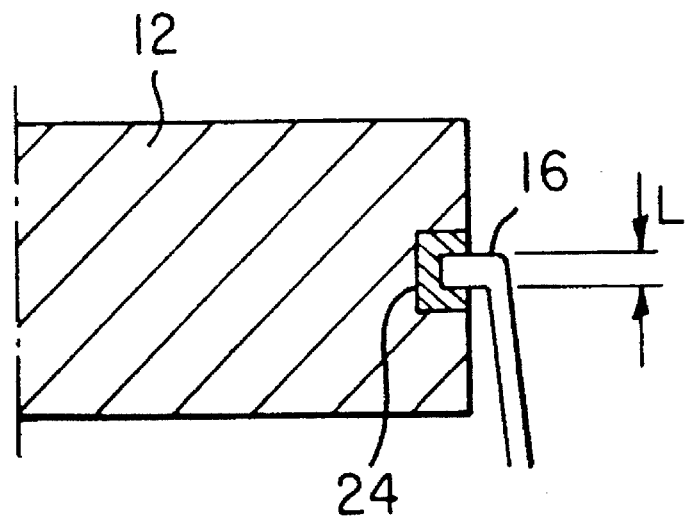
FIG. 18 shows an example of the connection of a honeycomb heater and supporting member(s), employed in the present invention.

Incidentally, FIG. 15 shows a case wherein the connection area(s) between a honeycomb heater 12 and supporting member(s) 16 is (are) in the vicinity of the periphery of the honeycomb heater 12.

Figure 19:
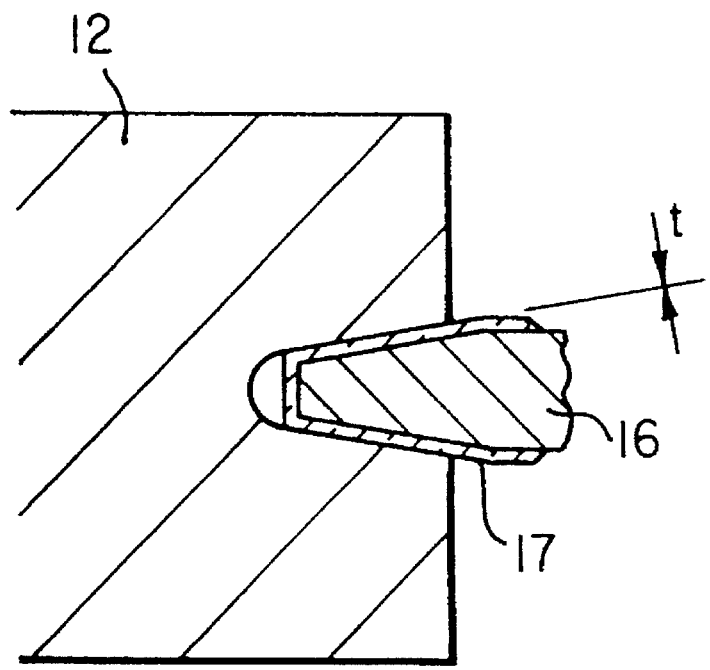
FIG. 19 is a fragmentary sectional view showing another example of the periphery of the honeycomb heater used in the present invention.
Figure 20:
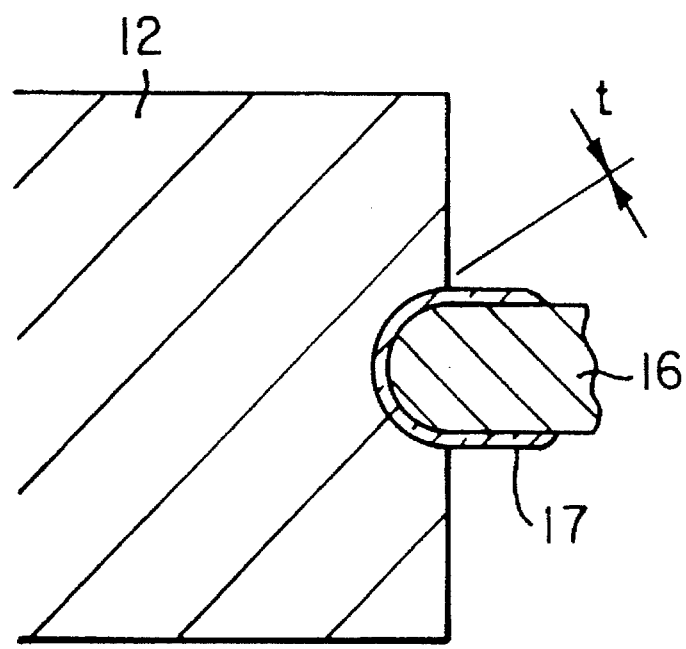
FIG. 20 is a fragmentary sectional view showing still another example of the periphery of the honeycomb heater used in the present invention.

FIGS. 19 and 20 are application examples of the connection between supporting member and honeycomb heater, shown in FIG. 3. In these examples, each supporting member 16 has a different sectional shape at the connection area between honeycomb heater and supporting member. In FIG. 19, the groove 13 of a honeycomb heater 12 and the arc portion 14 of a supporting member 16 are formed so as to have a taper against a plane parallel to the radical direction of the honeycomb heater 12. In FIG. 20, the groove 13 of a honeycomb heater 12 and the arc portion of a supporting member 16 are formed so as to have a roundness. Owing to these structures, each connection area between supporting member 16 and honeycomb heater 12 can have a smaller clearance, whereby a higher adhesion strength can be obtained.

Figure 21:
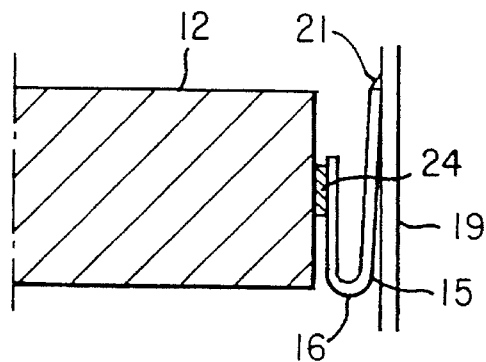
FIG. 21 shows an example of the connection of a honeycomb heater and a casing via supporting member(s), employed in the present invention.

FIG. 21 shows a supporting member 16 having a U-shaped section. This U-shaped structure functions as a spring against the displacement of a honeycomb heater 12 in its radial direction.

Figure 22A:
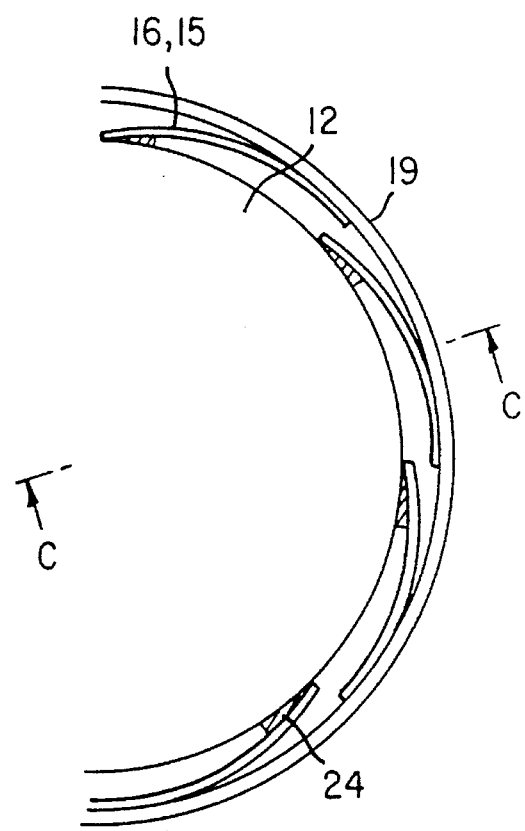
FIGS. 22(A) and 22(B) show still other example of the heater unit according to the first aspect of the present invention.
Figure 22B:
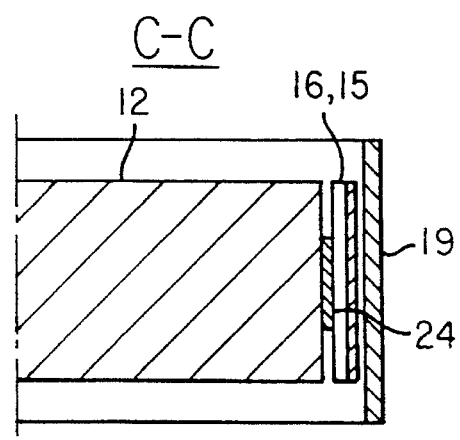

FIGS. 22(A) and 22(B) show a case wherein plate-like supporting members 16 are provided at the periphery of a honeycomb heater 12 in a swirl shape. These supporting members 16 function as a spring against the displacement of the honeycomb heater 12 in its radial direction.

Figure 23A:
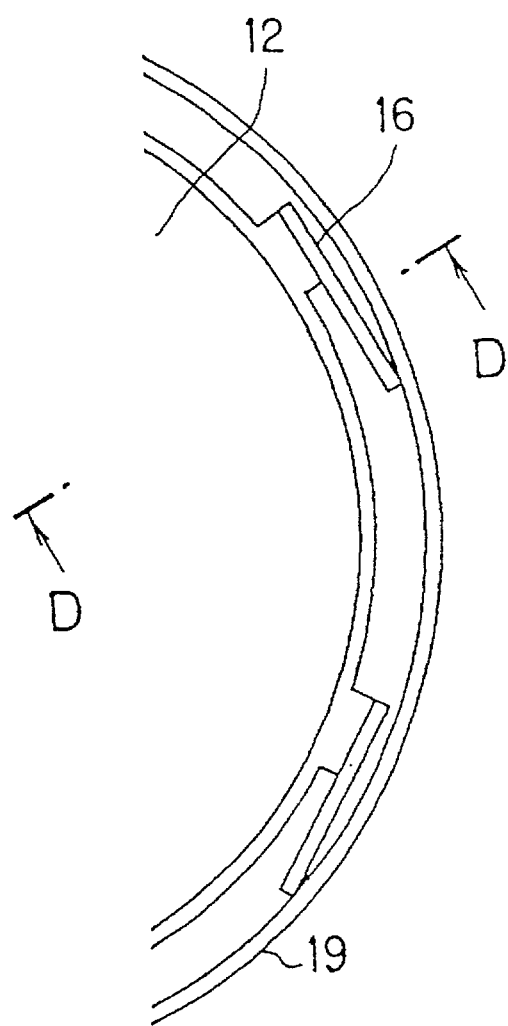
FIGS. 23(A) and 23(B) show still another example of the heater unit according to the first aspect of the present invention.
Figure 23B:
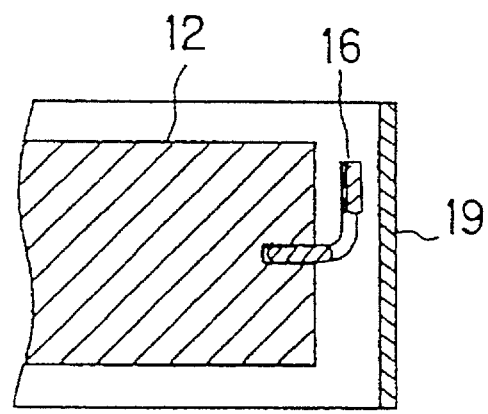
Figure 29:
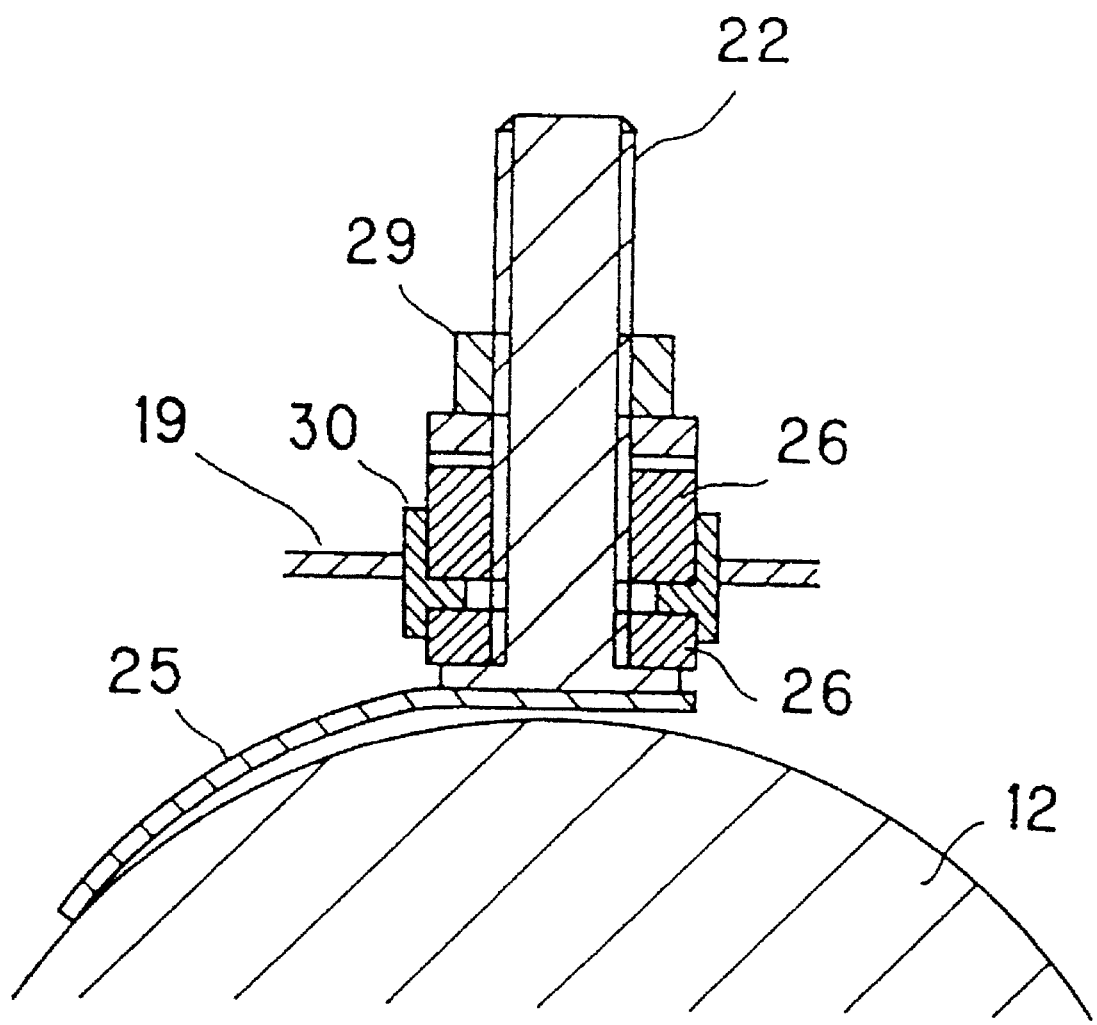
FIG. 29 is a fragmentary sectional view showing an example of the electrode structure used in the second aspect of the present invention.

FIGS. 23(A) and 23(B) show a case wherein a supporting member 16 is connected with a honeycomb heater 12 via the latter's groove and, as in FIGS. 22(A) and 22(B), has spring portions in a swirl shape at the periphery of the heater 12. Since the supporting members 16 shown in FIGS. 22(A) and 22(B) and FIGS. 23(A) and 23(B) have spring portions at the periphery of each honeycomb heater 12 in a swirl shape, the length of supporting member in gas flow direction can be made shorter than those of other type supporting members. When the supporting member 16 is connected with an electrode as shown in FIG. 29, the direction of the swirl of the supporting member 16 and that of the connecting member 25 are preferably coincidental with each other because the direction of thermal expansion and thermal shrinkage of the supporting member 16 coincides that of the connecting member 25 and thereby interference is not caused.

Figure 24:
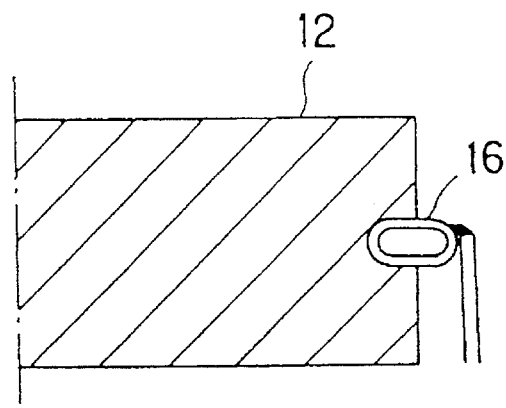
FIG. 24 shows an example of the connection of a honeycomb heater and a supporting member, employed in the present invention.
Figure 25:
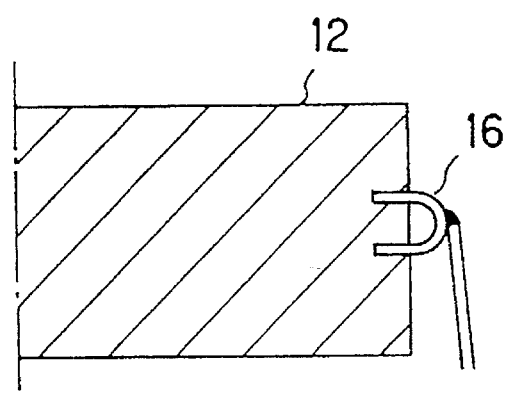
FIG. 25 shows an example of the connection of a honeycomb heater and a supporting member, employed in the present invention.
Figure 26:
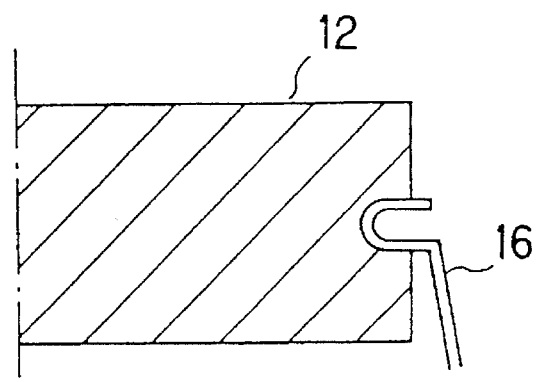
FIG. 26 shows an example of the connection of a honeycomb heater and a supporting member, employed in the present invention.
Figure 27:
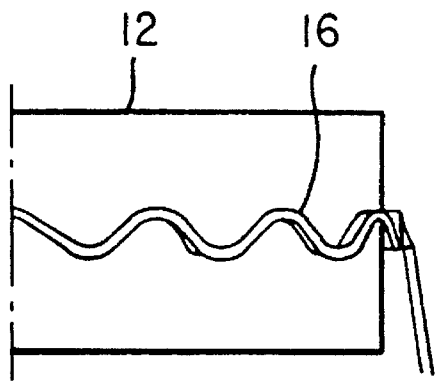
FIG. 27 shows an example of the connection of a honeycomb heater and a supporting member, employed in the present invention.

FIGS. 24 to 27 show cases wherein a supporting member 16 is made lighter at the area connecting with a honeycomb heater 12 while maintaining the strength at said area, in order to be able to quickly follow the temperature change of the honeycomb heater 12. That is, FIG. 24 is a case wherein the arc portion 14 of a supporting member 16 is made of a hollow ring; FIGS. 25 and 26 are each a case wherein the arc portion 14 of a supporting member 16 is made of a ring having a U-shaped section; and FIG. 27 is a case wherein the arc portion of a supporting member 16 is formed in a wave shape so that the connection area between honeycomb heater 12 and supporting member 16 can have a higher strength.

Figure 28:
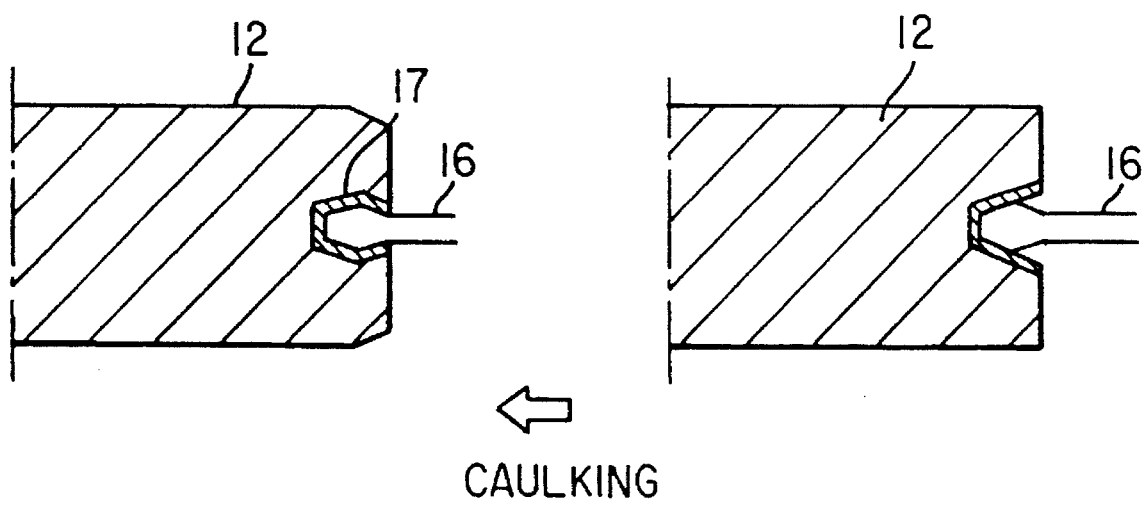
FIG. 28 shows an example of the connection of a honeycomb heater and a supporting member, employed in the present invention.

FIG. 28 is a case wherein a supporting member 16 has a polygonal sectional shape at the front end. An insulating coating 17 is coated on the front end; the coated front end is inserted into the groove of a honeycomb heater 12 (no cementing material is used); and the mouth of the groove is caulked.

In the first aspect of the present invention, each of the honeycomb heater and the supporting member(s) for holding the heater, desirably has an intrinsic frequency of 1,000 Hz or more, preferably 2,000 Hz or more in the vibration of gas flow direction or radial direction of honeycomb heater so that the honeycomb heater and the supporting member(s) do not vibrate synchronously with the exhaust pipe of automobile and are not broken.

In order to increase the intrinsic frequency of the honeycomb heater in the direction of gas flow, an effective means is, for example, to make small the cut length of each slit or increase the thickness of the heater in the gas flow direction.

In order to increase the intrinsic frequency of the honeycomb heater in the radial direction, an effective means is to make small the cut length of each slit or to increase the number of cells between two adjacent slits. These means, however, result in decrease in the resistance of the honeycomb heater. Therefore, in order to obtain a heater unit having a desired resistance, it is necessary to design a honeycomb heater so as to have an appropriate diameter, an appropriate thickness in gas flow direction, an appropriate number of slits, etc. as well as an intrinsic frequency satisfying the above requirement.

In order to increase the intrinsic frequency of the supporting member(s), an effective means is, for example, to make short the length of each leg, make large the width of each leg, or increase the number of legs. When the length of each leg is too small, the leg portions come to have a large stress owing to the difference in heat expansion between arc portion(s) of supporting member(s) and casing, leading to fatigue breakage. It is therefore necessary to design supporting member(s) so as to have a stress of 30 kg/mm$^2$ or less, preferably 15 kg/mm$^2$ or less as well as an intrinsic frequency satisfying the above requirement.

Next, description is made on the second aspect of the present invention.

In the second aspect, the heater unit must have at least one electrode for electrification of the honeycomb heater. Ordinarily, electrodes are directly connected with a honeycomb structure by welding or the like to form a honeycomb heater; then, the electrodes are fixed to a casing via an insulator or the like to form a heater unit; in this heater unit, the electrodes may deform the honeycomb heater owing to the relative displacement between casing and honeycomb heater, caused by their difference in heat expansion. Hence, there arises a necessity of improving the connection between electrodes and honeycomb heater. Such an example of improved connection between electrodes and honeycomb heater is hereinafter described in detail as the heater unit of type D.

A typical example of the type D heater unit is shown in FIG. 29. As shown in FIG. 29, a honeycomb heater 12 is connected with an electrode 22 via a metallic connecting member 25. The connecting member 25 must have functions of (1) absorbing the displacement of the honeycomb heater 12 appearing in the radial direction and (2) fixing the honeycomb heater 12 in the direction of gas flow. Therefore, the connecting member 25 can be made of the same material and the same shape as used in the aforementioned supporting member. Needless to say, the connecting member 25 must have a very small electrical resistance in order to ensure the desired heat generation by the honeycomb heater.

The connection between connecting member 25 and honeycomb heater 12 and between connecting member 25 and electrode 22 can be conducted by an appropriate means such as welding or the like.

The electrode 22 is fastly fixed to a casing 19 by a washer and a nut 29 via insulating members 26 consisting of an insulating material (e.g. insulator) and a jig 30 for fixing the insulating member 26.

In the type D heater unit, since the electrode is fixed to the honeycomb heater 12 via the connecting member 25, a risk of breakage of the honeycomb heater 12 is small even when an external impact is applied to the electrode 22.

Figure 30:
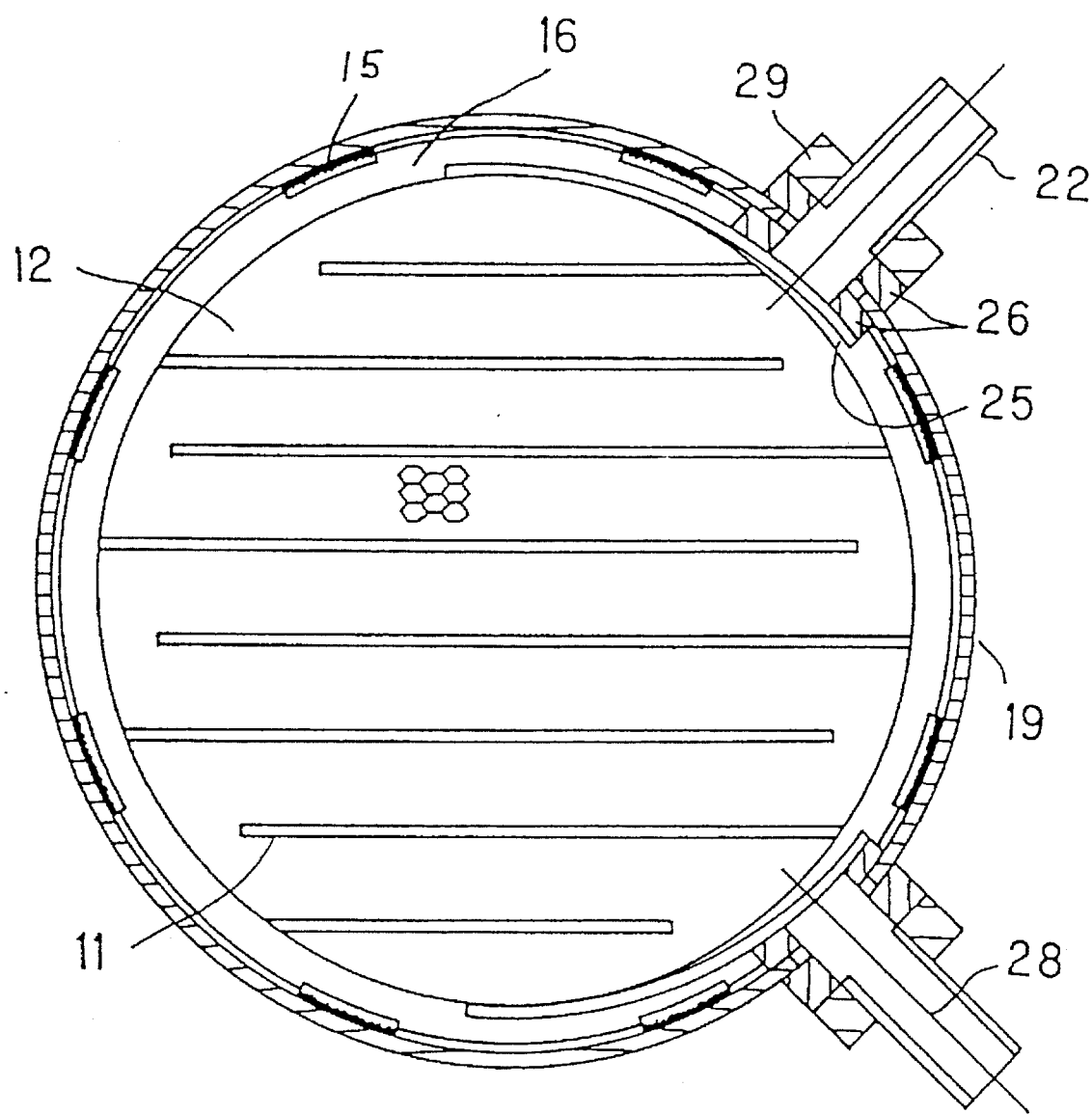
FIG. 30 is a plan view showing an example of the heater unit of the first aspect of the present invention, having the electrode structure used in the second aspect of the present invention.

The heater unit of FIG. 30 is an example of the type D wherein a honeycomb heater 12 is held in a casing 19 by a supporting member 16 according to the same holding method as in the type A. The type D can be effectively applied to various other examples than the example of FIG. 30.

Figure 31A:
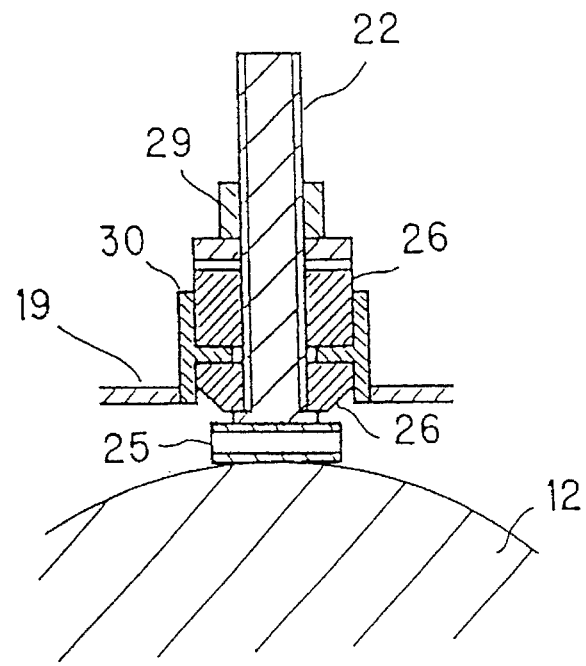
FIGS. 31(A) and 31(B) show another example of the electrode structure used in the second aspect of the present invention.
Figure 31B:
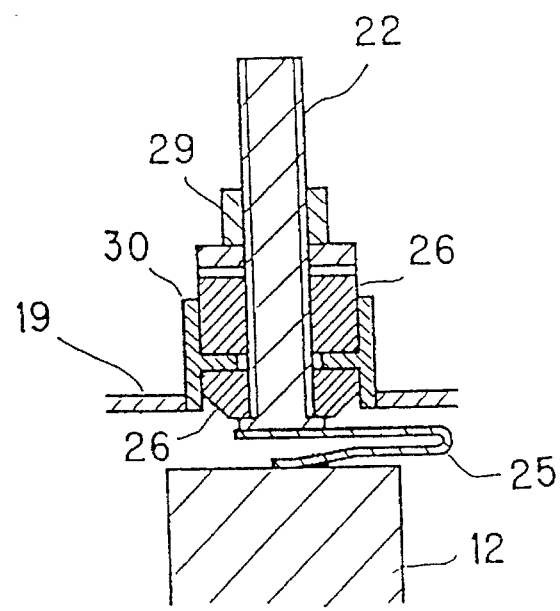

Another preferable example of the type D heater unit is shown in FIGS. 31(A) and 31(B), wherein a connecting member 25 having a nearly U-shaped section, obtained by folding a metallic plate is provided between an electrode 22 and a honeycomb heater 12.

In the second aspect of the present invention, the connecting member provided between electrode and honeycomb heater, has a spring function so as to be able to absorb the displacement caused by the difference in heat expansion between honeycomb structure and casing. The spring force of the connecting member is desirably 4 kgf/mm or less, preferably 1 kgf/mm or less in terms of spring modulus, per unit length of honeycomb structure in gas flow direction. When the spring modulus is larger than 4 kgf/mm, the spring force of the connecting member is too large and, as a result, the connecting member may smash the honeycomb portion of honeycomb heater close to the connecting member. Further, the connecting member preferably has a sectional area of 10 mm² or more, preferably 15 mm² or more and a length of 50 mm or less, preferably 20 mm or less in order to minimize the temperature elevation and consequent expansion of the connecting member when electrified. When the sectional area and the length deviate from the above ranges, the connecting member may be melted by abnormal temperature elevation, or the connecting member may expand too much and a large stress may appear in the connecting member, the electrode and the honeycomb heater (the electrode and the honeycomb heater are in contact with the connecting member); consequently, breakage may appear. Since the decrease in spring modulus of connecting member opposes the increase in sectional area and decrease in length of connecting member, the connecting member must be designed so as to have a good balance in these properties.

Next, the third aspect of the present invention is described.

The third aspect also has a feature in its electrode structure, similarly to the second aspect.

Figure 32:
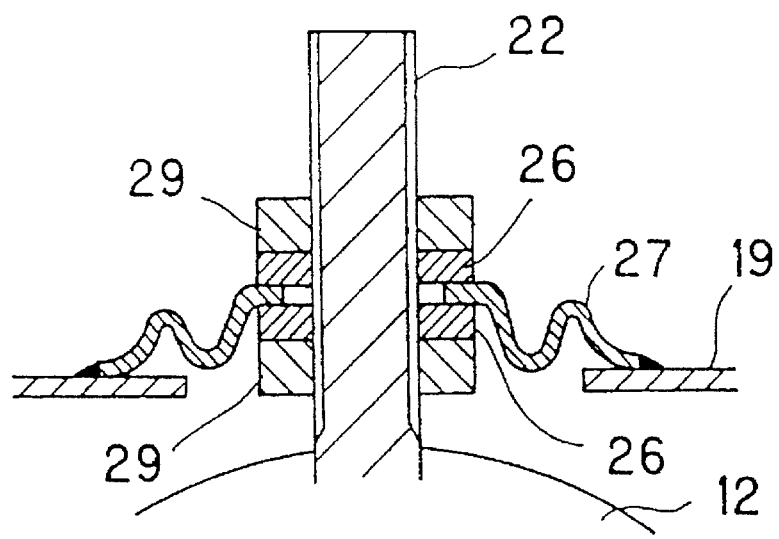
FIG. 32 is a fragmentary sectional view showing an example of the electrode structure used in the third aspect of the present invention.

An example of the third aspect is shown as type E, and its electrode structure is shown in FIG. 32.

As shown in FIG. 32, an electrode 22 is directly connected with a honeycomb heater 12 by means of welding or the like and further is connected with insulating members 26 consisting of an insulating material (e.g. insulator) by nuts 29; and the insulating members 26 are fixed to a casing 19 via a buffer member 27. The buffer member 27, similarly to the aforementioned supporting member and connecting member, absorbs the displacement of the honeycomb heater 12 in its radial direction and can fix the honeycomb heater 12 against its displacement in the direction of gas flow.

In the third aspect, the buffer member, similarly to the connecting member of the second aspect, desirably has a spring modulus of 4 kgf/mm or less, preferably 1 kgf/mm or less per unit length of honeycomb structure in gas flow direction. When the spring modulus is larger than 4 kgf/mm, the spring force of the buffer member is too large and, as a result, the buffer member may smash the honeycomb portion of honeycomb heater close to the buffer member.

When the type D heater unit according to the second aspect and the type E heater unit according to the third aspect employ the supporting member(s) used in the type A, B, C or the like, such heater units show substantially neither deformation nor breakage of honeycomb heater and are most preferable.

The present invention is hereinafter described in more detail referring to Examples. However, the present invention is not restricted to these Examples.
(1) Preparation of honeycomb heaters
Production of honeycomb structures A Fe powder, a Cr—Al powder (Al: 30% by weight), a Fe—Al powder (Al: 50% by weight), a Fe—B powder (B: 20% by weight) and a $Y_2O_3$ powder all having an average particle diameter of 44 μm or less were mixed so as to give a composition of Fe-12Cr-10Al-0.05B-0.5$Y_2O_3$. To the mixture were added 4 g, per 100 g of the mixture, of methyl cellulose as an organic binder and 1 g of oleic acid as an antioxidant, and they were mixed to obtain a readily formable body. The body was extruded to obtain, as an extrudate, a columnar honeycomb body having a diameter of 113 mm and a thickness of 30 mm.

The columnar honeycomb body was dried in air at 90° C. for 16 hours and then sintered in a hydrogen atmosphere at 1,325° C. for 2 hours to obtain a honeycomb structure of 93 mm in outside diameter and 25 mm in thickness comprising hexagonal cells each having a rib thickness of 0.1 mm, at a cell density of 450 cells/in.². Then, at the periphery of the honeycomb structure was formed, by cylindrical grinding, a groove 13 of 3.5 mm in width and 4 mm in depth. Further, in the honeycomb structure were formed, by grinding using a diamond saw, slits 11 in a direction parallel to the axial direction of the passages (cells) so that the number of cells between two adjacent slits became eight. The resulting honeycomb structure was heat-treated in air at 1,150° C. for 30 minutes, to obtain a honeycomb structure 10 as shown in FIGS. 1(A) and I(B).
Loading of catalyst A $\gamma$-$Al_2O_3$ powder and a $CeO_2$ powder were separately prepared so that their weight ratio became 70:30. Each powder was mixed with water and a small amount of nitric acid, and each mixture was pulverized by a wet method to obtain two slurries. The previously prepared honeycomb structure 10 was dipped in each of the slurries to form a washcoat layer. The washcoat layer was dried and then fired at 500° C. to form a $\gamma$-$Al_2O_3$ and $CeO_2$ layer. The resulting honeycomb structure was dipped in an aqueous solution containing chloroplatinic acid and rhodium nitrate, to load thereon Pt and Rh at a molar ratio of 5:1 in a total amount of 40 g/ft³.
Fixation of electrodes
(Type D)

As shown in FIG. 30, one end of an electrically-conductive plate (connecting member) 25 made of SUS 409L and having a thickness of 1.5 mm, a width of 15 mm and a length of 45 mm, which was bent at an R of 50 mm in the length direction, was welded to an screw electrode 22 made of SUS 409L and having an outside diameter of 10 mm, a pitch of 1.25 mm and a length of 30 mm. The other end of the electrically-conductive plate 25 was welded to the honeycomb structure 10.

As shown in FIG. 30, the fixation of the electrode 22 to a casing 19 was conducted by pushing out part of the electrode 22 through a hole 28 of 14 mm in diameter made in the casing 19, with $Al_2O_3$-made insulators 26 (each having an inside diameter of 11 mm, an outside diameter of 20 mm and a thickness of 4 mm) provided inside and outside the casing 19 at the periphery of the hole and then fixing the electrode 22 to the casing 19 using a nut 29.
(Type E)

A bolt (electrode) 22 made of SUS 409L and having a outside diameter of 10 mm, a pitch of 1.25 mm and a length of 40 mm was welded to the honeycomb structure 10.

Separately, there was prepared a round buffer member 27 (shown in FIG. 32) made of SUS 310S and having a thickness of 0.8 mm and an outside diameter of 50 mm, which had concentric waves and had, in the center, a hole of 14 mm in diameter.

As shown in FIG. 32, the fixation of the electrode 22 to a casing 19 was conducted by tightening the electrode 22 and the buffer member 27 with nuts 29 via the same insulators 26 as used in the type D and then welding the periphery of the buffer member 27 to the casing 19. (Type F)

An electrode 22 was welded to the honeycomb structure 10 in the same manner as used in the type E. Separately, there was prepared a jig 30 for fixation of insulator (shown in FIG. 33), made of SUS 310S and having an outside diameter of 23 mm and a height of 10 mm, which had, at each side, a dent of 20.5 mm in inside diameter and, in the center, a hole of 14 mm in diameter. There was also prepared two Al$_2$O$_3$-made insulators 26 having an inside diameter of 11 mm, an outside diameter of 20 mm and a height of 4 mm or 8 mm.

Figure 33:
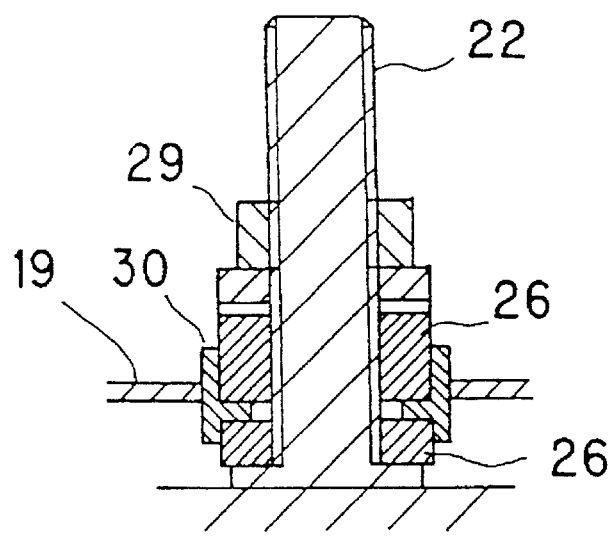
FIG. 33 is a fragmentary sectional view showing an example of the conventional electrode structure of fastly fixed type.

As shown in FIG. 33, the fixation of the electrode 22 to a casing 19 was conducted by fixing the insulators 26 and the jig 30 for fixation of insulator, to the electrode 22 with a washer and a nut 29 and then inserting the electrode 22, etc. into a hole of 23.5 mm in diameter provided in the casing 19, followed by welding.

(2) Preparation of heater units

EXAMPLE 1

After the honeycomb structure 10 had been loaded with a catalyst, an electrically-conductive plate 25 fixed to an electrode of type D was fitted to the honeycomb structure 10. Separately, there were prepared two SUS 310S-made supporting members 16 as shown in FIG. 2, each having (1) a half-ring-shaped arc portion 14 having a thickness of 3 mm, an outer circumference of R=44 mm and an inner circumference of R=35.5 mm and (2) four legs 14 each having a thickness of 1.5 mm, a width of 8 mm and a length of 20 mm. Each arc portion 14 of the supporting members 16 was coated with alumina in a thickness of 20–25 μm by flame spraying to form an insulating coating 17.

Then, into the portion of each slit 11 formed in the honeycomb structure 10, other than the groove portion 13 was inserted a spacer having a thickness of 0.8 mm, to temporarily plug up the slit. Thereafter, an inorganic cement was filled in the groove portion 13, after which the two supporting members 16 were inserted into the groove 13. The resulting material was dried in air at 100° C. for 1 hour and then at 300° C. for 1 hour, whereby the supporting members 16 were fixed to the honeycomb structure 10. Incidentally, the inorganic cement was Bond X #64 (made mainly of Al$_2$O$_3$) manufactured by Nihon Kagaku Kogyo. After the drying, the spacer was removed, and the two supporting members 16 were connected at their ends by welding, for cyclization as shown in FIG. 4. Then, the legs 15 of the supporting member 16 fixed to the honeycomb heater 12 were fixed to a SUS 310S-made casing 19 of 1.5 mm in thickness by welding, as shown in FIG. 5. At the outer periphery of the honeycomb heater 12 was provided a ceramic mat 20 [Interam (trade name) manufactured by Sumitomo 3M] for prevention of gas leakage. A baffle having an inside diameter of 93 mm was welded to the casing 19 and fixed to prevent the mat 20 from erosion Electrodes were fixed according to the method of type D. Thus, a honeycomb heater unit A as shown in FIG. 5 was obtained which had the legs 15 of the supporting member 16 at the gas inlet side and which had a total length of 100 mm and a resistance of 30 mΩ.

EXAMPLE 2

There were prepared supporting members 16 as shown in FIG. 9, which were the same as those of Example 1 except that they had a vertical angle of 85°. Using these supporting members 16, a honeycomb heater 12 as shown in FIG. 10 was obtained in the same manner as in Example 1.

Electrodes of type E were fitted to the honeycomb heater 12 and the other procedure was the same as in Example 1, whereby a honeycomb heater unit B was obtained.

EXAMPLE 3

There was obtained a shaped honeycomb body having the same shape as in Example 1, in the same manner as in Example 1. Separately, there were prepared six shaped blocks made of the same material as that of the shaped honeycomb body and having dimensions of 1.5 mm (thickness)×10 mm×10 mm.

The shaped blocks were fitted onto the periphery of the shaped honeycomb body using a paste produced by mixing the same material as used in the shaped honeycomb body, with a small amount of water. Then, firing, slit formation and loading of catalyst were conducted in the same manner as in Example 1 to produce a honeycomb structure as shown in FIG. 12. There were prepared, as shown in FIG. 13, SUS 409L-made supporting members 16 each having a width of 8 mm, a length of 24 mm and a thickness of 1.5 mm. One end of each supporting member 16 was welded to the block portion of the honeycomb structure 10. Then, the other end of each supporting member 16 was covered with a knitted fiber mat 23 [Nextel (trade name) manufactured by Sumitomo 3M] made of an alumina-silica continuous fiber, and inserted into the groove formed in a casing 19, after which the mouth of the groove was caulked for fixation. Electrodes of type E were fitted in the same manner as in Example 2, and a mat for prevention of gas leakage and a baffle were provided in the same manner as in Example 1. Thus, a honeycomb heater unit C having a structure as in FIG. 12 was obtained.

EXAMPLE 4

A honeycomb heater unit D was obtained in the same manner as in Example 1 except that electrodes were fitted according to the method of type F.

EXAMPLE 5

A honeycomb heater unit E was obtained in the same manner as in Example 2 except that electrodes were fitted according to the method of type F.

Comparative Example 1

A honeycomb heater 12' having slits and a catalyst loaded but having no groove was obtained in the same manner as in Example 1. Into the open end of each honeycomb heater slit at the honeycomb heater periphery was inserted a ZrO$_2$-made spacer having a thickness of 0.8 mm, a width of 15 mm and a height of 4 mm, and the spacer was cemented to the honeycomb heater with the same inorganic cement as used in Example 1. Drying was conducted in air at 100° C. for 1 hour for fixation. The honeycomb heater 12' was placed inside a SUS 310S-made supporting member 16' of 1 mm in thickness and 37 mm in width, having electrode holes.

Figure 34:
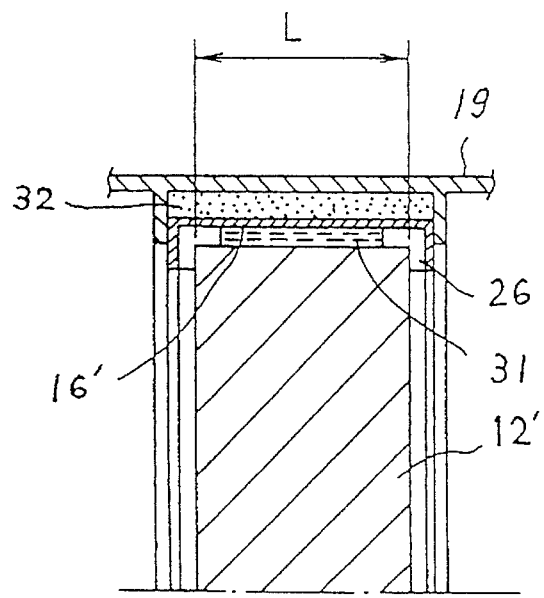
FIG. 34 is a fragmentary sectional view showing an example of the structure for holding a honeycomb heater, employed in Comparative Example 1.
Figure 35:
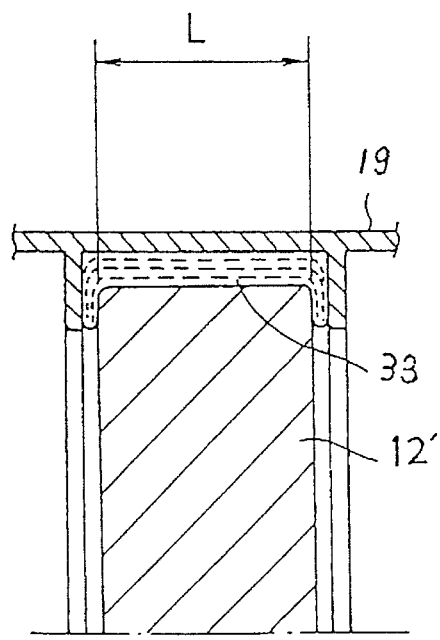
FIG. 35 is a fragmentary sectional view showing an example of the structure for holding a honeycomb heater, employed in Comparative Example 2.

Between the honeycomb heater 12' and the supporting member 16' were placed an inorganic cement layer 31 and insulators 26 of 2 mm in thickness, as shown in FIG. 34. Drying was conducted in air at 100° C. for 6 hours and then at 300° C. for 3 hours to obtain a supporting member-fixed honeycomb heater 12' as shown in FIG. 34.

A mat 32 [Interam (trade name) manufactured by Sumitomo 3M] having a thickness of 3.4 mm was wound round the periphery of the honeycomb heater 12'. The resulting honeycomb heater was engaged in a casing 19 of 1.5 mm in thickness, having a dented portion of 37.5 mm in width. Electrodes of type F were fitted in the same manner as in Example 4. Thus, a honeycomb heater unit F having the same shape as in Example 1 was obtained.

Comparative Example 2

A spacer-inserted honeycomb structure was produced in the same manner as in Comparative Example 1. The same alumina-silica type fiber mat 33 (thickness=3 mm and width =30 mm) as used in Example 3 was wound round the periphery portion of the honeycomb structure other than the electrode portions. The resulting honeycomb structure was engaged in a casing 19 having a dented portion of 31 mm in width, which was similar to the casing used in Comparative Example 1. Electrodes were fitted in the same manner as in Comparative Example 1. Thus, a honeycomb heater unit G was obtained.

(3) Burner durability test under vibration

The heater units obtained in Examples 1–5 and Comparative Examples 1–2 were examined for durability by a burner durability test under vibration, which was a simulated actual-car durability test. That is, an exhaust gas from a propane burner was used (amount of air intake=1 m³/min and propane=20 Nl/min); and a cycle consisting of (a) temperature elevation of heater from 200° C. to 950° C. in 5 minutes and (b) temperature decrease from 950° C. to 200° C. in 5 minutes was repeated 200 times. At that time, a vibration of 28 G and 200 Hz was applied in the direction of gas flow, using a vibrator. The results are shown in Table 1.

TABLE 1

| | Heater unit | Electrode type | Results |
|---|---|---|---|
| Example 1 | A | D | No abnormality is seen. |
| Example 2 | B | E | No abnormality is seen. |
| Example 3 | C | E | No abnormality is seen. |
| Example 4 | D | F (fixed type) | Part of cells caused deformation at 200th cycle but there was neither insulation breakdown nor breakage of honeycomb structure. |
| Example 5 | E | F (fixed type) | Part of cells caused deformation at 200th cycle but there was neither insulation breakdown nor breakage of honeycomb structure. |
| Comparative Example 1 | F | F (fixed type) | Insulation breakdown at 50th cycle, and breakage of honeycomb structure at 51th cycle. |
| Comparative Example 2 | G | F (fixed type) | Insulation breakdown at 10th cycle, and breakage of honeycomb structure at 12th cycle. |

As is appreciated from Table 1, the heater unit having the holding mode and electrode structure of the present invention has sufficient structural durability against the severe heat shock and vibration appearing in the exhaust pipe of automobile.

As described above, the present invention can provide a heater unit which gives rise to neither breakage of honeycomb heater nor peeling when exposed to severe driving conditions of automobiles, etc. and subjected to vibration and the expansion and contraction caused by thermal shock.

What is claimed is:

1. A heater unit comprising:
   a honeycomb heater comprising a metallic honeycomb structure having a large number of parallel passages extending along an axial direction, and at least one electrode for electrification of the honeycomb structure, attached to the honeycomb structure;
   a metallic casing for holding the honeycomb heater;
   supporting means for supporting the honeycomb heater in the casing, absorbing displacement of the honeycomb heater with respect to the casing in a direction substantially perpendicular to the axial direction, and preventing displacement of the honeycomb heater with respect to the casing along the axial direction, said supporting means comprising at least one metallic supporting member connecting the honeycomb heater to the casing; and
   an insulation portion provided at at least one location from the group consisting of (i) between the honeycomb heater and the supporting member, and (ii) between the supporting member and the casing.

2. A heater unit according to claim 1, wherein said supporting member is flexible in the direction substantially perpendicular to the axial direction.

3. A heater unit according to claim 1, wherein each of the honeycomb heater and the supporting member has an intrinsic frequency of not less than 1000 Hz in the axial direction or direction substantially perpendicular to the axial direction.

4. A heater unit according to claim 1, further comprising an insulating member securing the electrode to the casing, and connecting means for connecting the electrode to the honeycomb structure, said connecting means absorbing displacement of the honeycomb heater with respect to the casing in a direction substantially perpendicular to the axial direction, said connecting means comprising a metallic connecting member.

5. A heater unit according to claim 1, wherein said supporting member comprises a plurality of thin plate members secured to the honeycomb structure and the casing.

6. A heater unit according to claim 1, further including a plurality of slits extending through the honeycomb structure.

7. A heater unit, comprising:
   a honeycomb heater comprising a metallic honeycomb structure having a large number of parallel passages extending along an axial direction, and at least one electrode for electrification of the honeycomb structure, attached to the honeycomb structure;
   a metallic casing for holding the honeycomb heater;
   supporting means for supporting the honeycomb heater in the casing, absorbing displacement of the honeycomb heater with respect to the casing in a direction substantially perpendicular to the axial direction, and preventing displacement of the honeycomb heater with respect to the casing along the axial direction, said supporting means comprising at least one metallic supporting member connecting the honeycomb heater to the casing;
   an insulation portion provided at at least one location from the group consisting of (i) between the honeycomb heater and the supporting member, and (ii) between the supporting member and the casing;

an insulating member secured to the electrode; and buffer means for securing the electrode to the casing and absorbing displacement of the honeycomb heater with respect to the casing in a direction substantially perpendicular to the axial direction, said buffer means comprising a buffer member provided between the insulating member and the casing.

8. A heater unit, comprising:

a honeycomb heater comprising a metallic honeycomb structure having a large number of parallel passages extending along an axial direction, and at least one electrode for electrification of the honeycomb structure, attached to the honeycomb structure;

a metallic casing for holding the honeycomb heater;

supporting means for supporting the honeycomb heater in the casing, absorbing displacement of the honeycomb heater with respect to the casing in a direction substantially perpendicular to the axial direction, and preventing displacement of the honeycomb heater with respect to the casing along the axial direction, said supporting means comprising at least one metallic supporting member connecting the honeycomb heater to the casing, wherein the supporting member comprises an arcuate portion having a plurality of leg portions extending therefrom, said arcuate portion being secured to the honeycomb structure and said leg portions being secured to the casing; and an insulation portion provided at at least one location from the group consisting of (i) between the honeycomb heater and the supporting member, and (ii) between the supporting member and the casing.

9. A heater unit according to claim 8, wherein the leg portions are spaced-apart along the arcuate portion.

10. A heater unit according to claim 8, wherein the arcuate portion is a one-piece annular member.

11. A heater unit according to claim 8, wherein the supporting member comprises a plurality of arcuate portions, each arcuate portion having at least one of said leg portions extending therefrom.

12. A heater unit comprising:

a honeycomb heater comprising a metallic honeycomb structure having a large number of parallel passages extending along an axial direction, and at least one electrode for electrification of the honeycomb structure, the electrode being secured to the casing via an insulating member;

a metallic casing for holding the honeycomb heaters; and connecting means for connecting the electrode to the honeycomb structure and absorbing displacement of the honeycomb heater with respect to the casing in a direction substantially perpendicular to the axial direction, said connecting means comprising a metallic connecting member.

13. A heater unit according to claim 12, wherein said connecting member has a spring modulus of not greater than 4 kgf/mm per unit length of honeycomb structure.

14. A heater unit according to claim 12, wherein said connecting member has sectional area of not less than 10 mm$^2$ and a length of not greater than 50 mm.

15. A heater unit according to claim 12, wherein said connecting member comprises at least one metallic plate.

16. A heater unit according to claim 12, further including a plurality of slits extending through the honeycomb structure.

17. A heater unit comprising:

a honeycomb heater comprising a metallic honeycomb structure having a large number of parallel passages extending along an axial direction, and at least one electrode for electrification of the honeycomb structure, the electrode being connected directly to the honeycomb structure and having an insulating member secured thereto;

a metallic casing for holding the honeycomb heater; and buffer means for securing the electrode to the casing and absorbing displacement of the honeycomb heater with respect to the casing in a direction substantially perpendicular to the axial direction, said buffer means comprising a buffer member provided between the insulating member and the casing.

18. A heater unit according to claim 17, wherein said buffer member has a spring modulus of not greater than 4 kgf/mm per unit length of honeycomb structure.

19. A heater unit according to claim 17, wherein said buffer member comprises at least one wavy plate.

20. A heater unit according to claim 17, further including a plurality of slits extending through the honeycomb structure.

* * * * *